United States Patent
Kunz et al.

(10) Patent No.: US 10,601,053 B2
(45) Date of Patent: *Mar. 24, 2020

(54) SEPARATOR PLATE FOR AN ELECTROCHEMICAL SYSTEM

(71) Applicant: REINZ-DICHTUNGS-GMBH, Neu-Ulm (DE)

(72) Inventors: Claudia Kunz, Ulm (DE); Stephan Wenzel, Pfaffenhofen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 72 days.

This patent is subject to a terminal disclaimer.

(21) Appl. No.: 15/760,692

(22) PCT Filed: Sep. 16, 2016

(86) PCT No.: PCT/EP2016/072073
§ 371 (c)(1),
(2) Date: Mar. 16, 2018

(87) PCT Pub. No.: WO2017/046398
PCT Pub. Date: Mar. 23, 2017

(65) Prior Publication Data
US 2018/0269497 A1 Sep. 20, 2018

(30) Foreign Application Priority Data

Sep. 18, 2015 (DE) .................... 20 2015 104 973 U

(51) Int. Cl.
*H01M 8/0254* (2016.01)
*H01M 8/247* (2016.01)
(Continued)

(52) U.S. Cl.
CPC ....... *H01M 8/0254* (2013.01); *H01M 8/0206* (2013.01); *H01M 8/0265* (2013.01);
(Continued)

(58) Field of Classification Search
CPC ............ H01M 8/0254; H01M 8/0271; H01M 8/0267; H01M 8/247; H01M 8/0206; H01M 8/0265
See application file for complete search history.

(56) References Cited

U.S. PATENT DOCUMENTS 8,158,299 B2    4/2012 Blank et al.
9,331,344 B2    5/2016 Asano et al.
(Continued)

FOREIGN PATENT DOCUMENTS

CA     2949586 A1    11/2015
DE    10248531 A1     4/2004
(Continued)

OTHER PUBLICATIONS

European Patent Office, International Search Report with Written Opinion issued in PCT/EP2016/072073, dated Nov. 23, 2016, 12 pages, European Patent Office, Rijswijk, Netherlands.
(Continued)

*Primary Examiner* — Stewart A Fraser
(74) *Attorney, Agent, or Firm* — McCoy Russell LLP

(57) ABSTRACT

A separator plate for an electrochemical system has at least one passage opening for forming a media channel for feeding or discharging media. At least one bead arrangement arranged around the at least one passage opening, for the purpose of sealing the passage opening is provided. At least one of the flanks of the bead arrangement has at least one opening for conducting a medium through the bead flank. At least one guide channel is connected, on an exterior of the bead arrangement, to the openings in the bead flank and is fluidically connected to a bead interior via the opening in the bead flank. The guide channel is designed such that a guide channel height perpendicularly to the flat surface plane of
(Continued)

the separator plate increases at least in some sections in the direction of said bead arrangement.

25 Claims, 13 Drawing Sheets

(51) Int. Cl.
      *H01M 8/0206* (2016.01)
      *H01M 8/0265* (2016.01)
      *H01M 8/0267* (2016.01)
      *H01M 8/0271* (2016.01)

(52) U.S. Cl.
      CPC ....... *H01M 8/0267* (2013.01); *H01M 8/0271* (2013.01); *H01M 8/247* (2013.01)

(56) References Cited

U.S. PATENT DOCUMENTS

| | | |
|---|---|---|
| 2007/0231619 A1 | 10/2007 | Strobel et al. |
| 2009/0325036 A1 | 12/2009 | Blank et al. |
| 2013/0177827 A1 | 7/2013 | Okabe et al. |
| 2015/0132680 A1 | 5/2015 | Asano et al. |
| 2016/0164122 A1* | 6/2016 | Jin .................... H01M 8/04201 429/434 |
| 2016/0380277 A1 | 12/2016 | Okabe et al. |
| 2019/0088956 A1* | 3/2019 | Glueck ............... H01M 8/0206 |

FOREIGN PATENT DOCUMENTS

| | | |
|---|---|---|
| DE | 102013208877 A1 | 11/2013 |
| DE | 202014004456 U1 | 5/2015 |
| JP | 2006504872 A | 2/2006 |
| JP | 2006302702 A | 11/2006 |

OTHER PUBLICATIONS

Japan Patent Office, Office Action Issued in Application No. 2018-513621, dated Dec. 24, 2019, 7 pages.

* cited by examiner

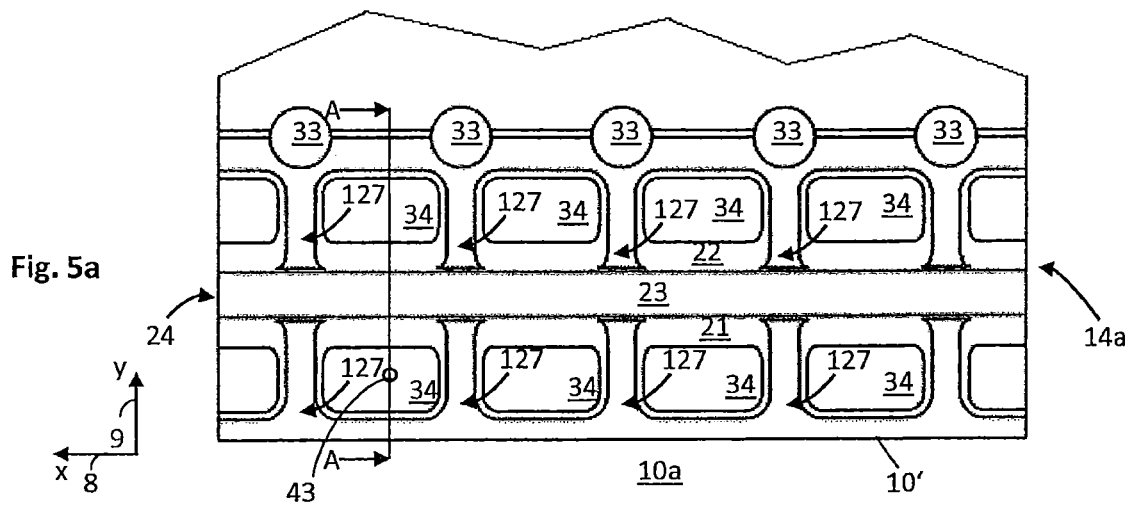
Fig. 5a
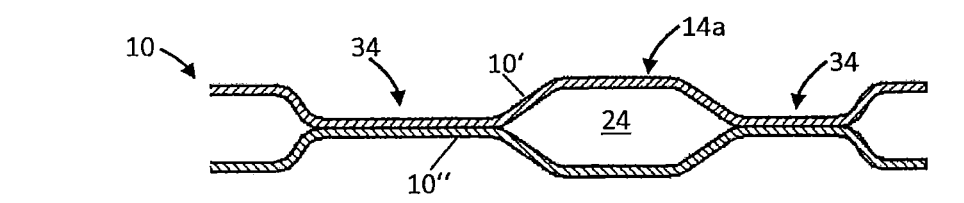
Fig. 5b
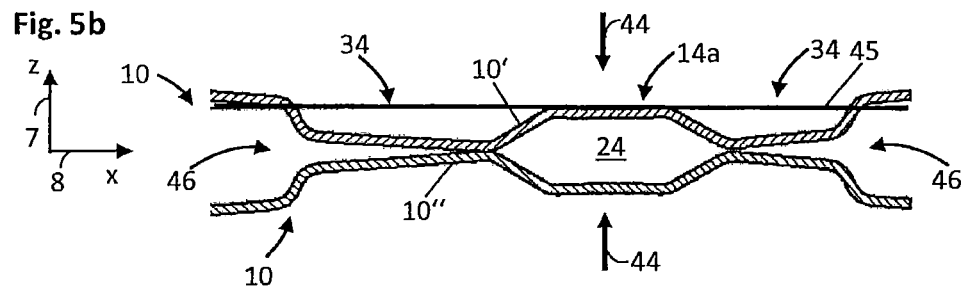
Fig. 5c
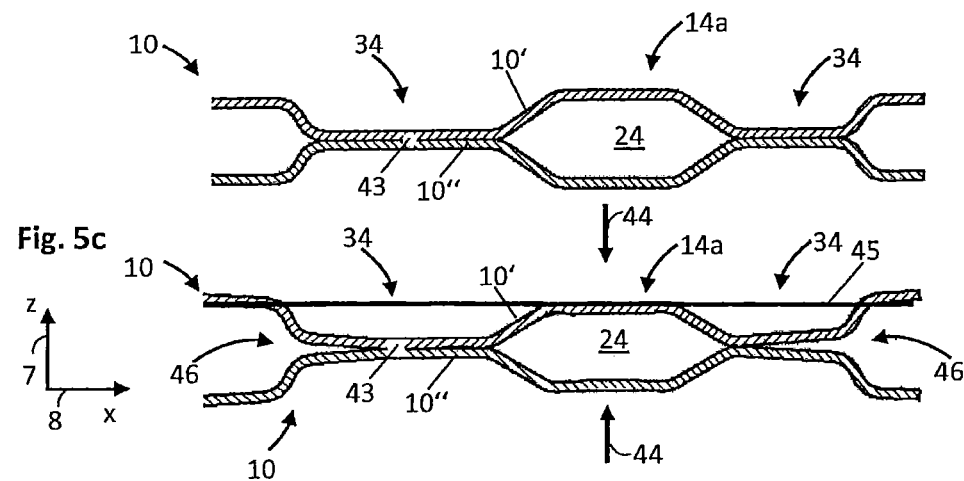
Prior Art

SEPARATOR PLATE FOR AN ELECTROCHEMICAL SYSTEM

BACKGROUND OF THE INVENTION

The invention relates to a separator plate for an electrochemical system. For example, the electrochemical system can be a fuel cell system, an electrochemical compressor, a humidifier for a fuel cell system, or an electrolyser.

Known electrochemical systems usually comprise multiple separator plates, which are arranged in a stack, so that every two adjacent separator plates enclose an electrochemical cell or a humidifier cell. The separator plates usually each comprise two individual plates, which are connected to one another along their rear sides facing away from the electrochemical cells or dehumidifier cells. For example, the separator plates can be used in order to electrically contact the electrodes of the individual electrochemical cells (for example fuel cells) and/or to electrically connect adjacent cells (series connection of the cells). The separator plates can also be used to dissipate heat produced in the cells between the separator plates. Waste heat of this kind can be produced for example at the time of conversion of electrical or chemical energy in a fuel cell. In the case of fuel cells, bipolar plates are often used as separator plates.

The separator plates or the individual plates of the separator plates each usually have at least one passage opening. The passage openings of the stacked separator plates, which openings are aligned or at least partially overlap with one another in the separator plate stack of the electrochemical system, then form media channels for feeding or discharging media. In order to seal the passage openings or the media channels formed by the passage openings of the separator plates, known separator plates also have bead arrangements, arranged one around each of the passage openings of the separator plate.

The individual plates of the separator plate can additionally have channel structures for feeding a medium or a plurality of media to an active region of the separator plate and/or for transporting media away. The active region for example can enclose or delimit an electrochemical cell or a humidifier cell. For example, the media can be constituted by fuels (for example hydrogen or methanol), reaction gases (for example air or oxygen) or can be present as a coolant in the form of fed media and can be constituted by reaction products and heated coolant as discharged media. In the case of fuel cells, the reaction media, i.e. fuel and reaction gases, are usually guided over the surfaces of the individual plates facing away from one another, whereas the coolant is guided between the individual plates.

The flanks of the bead arrangement arranged around the passage opening of the separator plate can have one or more openings. These openings are used to produce a fluidic connection between the passage opening of the separator plate and the active region of the separator plate or between the passage opening of the separator plate and a cavity formed between the individual plates of the separator plate. The cavity is used for example to guide a coolant between the individual plates of the separator plate.

It is known from document DE10248531A1 that the separator plate or at least one of the individual plates can additionally have one or more guide channels, which on an exterior of the bead arrangement are connected to the openings in the bead flank and are fluidically connected to a bead interior via the openings in the bead flank. A medium can pass through the bead arrangement much more specifically with the aid of guide channels of this kind. The efficiency of the electrochemical system can thus be increased.

However, the openings in the bead flanks necessarily bring about a reduction of the mechanical stability and elasticity of the bead arrangement. This reduction is all the greater, the lower the bead arrangement is arranged. At the same time, however, the shortest height possible of the bead arrangement is advantageous, in order to minimise the size of the separator plate stack and in order to accommodate more cells without increasing the height of the separator plate stack.

SUMMARY OF THE INVENTION

The object of the present invention is therefore to create a separator plate for an electrochemical system, which separator plate has the best possible mechanical stability and compactness and ensures the most efficient possible media supply of the system.

This object is achieved by a separator plate for an electrochemical system according to claim 1. Specific embodiments are described in the dependent claims.

Thus, what is proposed is a separator plate for an electrochemical system. The proposed separator plate comprises at least:
- at least one passage opening for forming a media channel for feeding or discharging media;
- at least one bead arrangement, arranged around the at least one passage opening, for the purpose of sealing said passage opening, wherein at least one of the flanks of the bead arrangement comprises at least one opening for conducting a medium through the bead flank; and
- at least one guide channel, which, on an exterior of the bead arrangement, is connected to the opening in the bead flank and is fluidically connected to a bead interior via the opening in the bead flank. For example, the separator plate can have precisely one guide channel per opening, which guide channel is connected to this opening.

Here, the guide channel is designed such that a height of the guide channel defined perpendicularly to the flat surface plane of the separator plate increases in the direction of the bead arrangement at least in sections. Here, the height of the guide channel denotes a distance of the highest point in cross-section of the roof of the guide channel from the flat surface plane of the individual plate of the separator plate on the surface pointing towards the bead roof, in which surface the guide channel is formed or which surface comprises the guide channel.

Conversely, this means that the height of the guide channel decreases away from the bead arrangement, at least in sections. The end of the guide channel distanced from the bead thus has a shorter height than in the prior art. As a result, as the bead arrangement is compressed, the lever effect acts on the guide channel only in a reduced manner, and therefore the end or another portion of the guide channel is deformed only to a small extent against the direction of compression of the bead arrangement, and therefore no portion of the guide channel protrudes beyond the bead roof in the compressed state.

The guide channel preferably is connected to the opening in the bead flank in such a way that the cross-sectional area of the guide channel at the transition of the guide channel into the bead flank is identical to and coincides with the face of the opening in the bead flank. The channel walls forming the guide channel thus transition into the bead flank typically directly at the edges of the opening in the bead flank. Here, a radius is usually formed at the transition from the side flanks of the guide channel to the relevant bead flank, and also from the channel roof to this bead flank. In the case of the height and width considerations of relevance to the invention, only the middle half, preferably the middle third of the guide channel, is therefore considered in the direction of extent of the guide channel.

In order to nevertheless be able to guide sufficient media from and to the bead, it is preferred if the guide channel also increases in height to the same extent to which it narrows in the direction of the bead arrangement. Efficient media passage through the bead flank is thus still ensured.

The guide channel can thus be designed such that a width of the guide channel, defined parallel to the flat surface plane of the separator plate, decreases in the direction of the bead arrangement at least in sections. The width of the guide channel is defined here preferably in each case at half height of the guide channel. The width of the guide channel is preferably determined in each case along a cross-sectional area of the guide channel oriented perpendicularly to the longitudinal direction of the guide channel or perpendicularly to the direction of media flow through the guide channel. The width of the guide channel can reduce monotonically in the direction of the bead arrangement at least over the 60% of the length of the guide channel not directly connected to the bead arrangement. The width of the guide channel, in this region, can reduce strictly monotonically in the direction of the bead arrangement, either continuously or at least in sections.

In particular, the guide channel can be designed such that the cross-sectional area of the guide channel, at least along the middle 25%, preferably the middle third of the extent of the guide channel, changes by 25% at most, preferably by 20% at most, preferably by 15% at most.

The guide channel usually extends from an end of the guide channel facing away from the bead arrangement and formed by an inlet and outlet of the guide channel, as far as the opening in the bead flank. Here, for example, the inlet or outlet of the guide channel can be formed by an opening in the separator plate in a layer of the separator plate or on an inner edge, for example an inner edge of a passage opening. If the inlet or outlet of a guide channel are not formed as an opening or on an inner edge, they can also be formed by transitions to other structures, by means of which they communicate with other guide channels. The guide channels, on the side of the bead facing away from a passage opening, usually have a similar length to the guide channels on the side of the bead facing towards a passage opening, usually between 50% and 200% of the length thereof. Put another way, the length of the guide channels is usually 20 times the height of the bead. On the side of the bead facing away from the passage opening, the guide channels can also be provided at their end with a step constituting the transition into another structure. As already mentioned, these ends of the guide channels are preferably provided with significant radii, which are used for the transition into the adjacent structure. With regard to the height and width considerations of relevance to the invention, only the middle half, preferably the middle third of the guide channel is therefore preferably taken into consideration.

The guide channel can be designed such that the height of the guide channel increases monotonically along the guide channel, preferably strictly monotonically. This is true in particular for the middle third of the length of the guide channel. The height of the guide channel can increase linearly along the extent of the guide channel. For example, the guide channel can be designed such that the height of the guide channel in the direction of the bead arrangement increases at least by 10%, preferably at least by 20%.

In order to ensure sufficient mechanical stability and minimally modified elasticity of the bead arrangement in the region of the opening in the bead flank, the opening can reach, perpendicularly to the flat surface plane of the separator plate, as far as a height that is up to 90%, preferably only up to 85%, particularly preferably only up to 75% of the height of the bead arrangement. Here, the heights preferably relate in each case to the bead arrangement in the uncompressed state and are given in each case by the distance of the highest point of the upper side of the roof of the bead from the flat surface plane of the individual plate pointing towards the bead roof.

An inlet or outlet of the guide channel at the end of the guide channel facing away from the bead arrangement can reach, perpendicularly to the flat surface plane of the individual plate, as far as a height that is at most 80%, preferably at most 70% of the height of the bead arrangement. Again, the height specifications are based here preferably on the bead arrangement in the uncompressed state and are given in each case by the distance from the flat surface plane of the individual plate. The height of the guide channel at the end of the guide channel facing away from the bead arrangement, however, is preferably always shorter than the height of the opening in the bead arrangement.

The guide channel can have a rectangular, trapezoid or at least partially rounded cross-section, at least in part, for example at least along the middle 25% or along the middle third of the extent of the guide channel. For example, the roof of the guide channel in the direction of the bead arrangement can have a convex curvature at least in part. The direct transition between guide channel and bead arrangement will by contrast typically display a slightly concave curvature.

In order to improve the mechanical stability and elasticity of the bead arrangement, the bead arrangement can be designed such that it runs in a wave-like manner parallel to the flat surface plane of the plate at least in sections, in particular in those regions that, macroscopically considered, extend in a straight line. This results in a stability and elasticity of these regions comparable to regions that already have a curvature on account of the overall direction of the bead, for example in corner regions. Due to the wave-like extent, a wavelength can then be given. A portion of the bead arrangement extending in a wave-like manner preferably extends over at least two wavelengths.

Only in the regions directly adjacent to an inflection point of the wave-like extent of the bead arrangement do comparable conditions prevail at both flanks of the bead arrangement, in particular also in respect of elasticity and stability. It is therefore advantageous when the opening in the bead flank connected on the exterior of the bead flank by the guide channel is arranged or formed in the region of an inflection poin of the portion of the bead arrangement extending in a wave-like manner, for example in particular in those portions of the bead arrangement extending in a wave-like manner in which the bead arrangement extends in a straight line macroscopically.

If, by contrast, a maximum length of the guide channel is to be attained with many design possibilities or a minimum length of the guide channel with a low pressure loss, the opening in the bead flank is thus preferably arranged or formed on a minimum or maximum (as considered from the guide channel) of the portion of the bead arrangement extending in a wave-like manner.

An inner edge of the separator plate delimiting the passage opening in the separator plate can likewise run in a wave-like manner, at least in sections. This portion of the inner edge extending in a wave-like manner can be arranged between the portion of the bead arrangement extending in a wave-like manner and the passage opening. Here, the following can be true for a first wavelength $\lambda_1$ of the portion of the inner edge extending in a wave-like manner and for a second wavelength $\lambda_2$ of the portion of the bead arrangement extending in a wave-like manner: $\lambda_2=\lambda_1$ or $\lambda_2=2\cdot\lambda_1$. With $\lambda_2=\lambda_1$, equal lengths of the guide channel result everywhere, and therefore very homogenous conditions are attained. With $\lambda_2=2\cdot\lambda_1$, the distance between the inner edge and the bead flank of the inner edge is shortened compared to a straight course, and therefore the lever effect occurring as the bead arrangement is compressed is reduced.

The separator plate can be formed as a bipolar plate with two individual plates connected to one another, wherein the bead arrangement and the guide channel are formed in at least one of the individual plates. The separator plate and/or the individual plates can be formed from metal, preferably from stainless steel. In order to improve the conductivity and in order to reduce the risk of corrosion, the individual plates can be coated at least in part. A thickness of the individual plates defined perpendicularly to the flat surface plane of the separator plate or the individual plates can be, in each case, between 50 μm and 150 μm, preferably between 70 μm and 110 μm. The bead arrangement, the guide channel, and the individual plate, in which the bead arrangement and the guide channel are formed, can be formed in one piece. For example, the bead arrangement and the guide channel can be formed integrally, in particular stamped, in the individual plate.

At least one of the flanks of the bead arrangement can have multiple openings, each of which is connected on the exterior of the bead arrangement by a guide channel of the previously described type, which widens away from the bead arrangement at least in sections. An integrally bonded connection can be formed between the individual plates, between directly adjacent guide channels or at least between some of the guide channels arranged directly adjacently to one another. The integrally bonded connection can be a soldered connection, an adhesively bonded connection, or a welded connection, in particular a connection produced by laser welding. The connection can be provided over a continuous line or over individual short lines or at specific points. These integrally bonded connections mean that the individual plates of the bead arrangement, in a region of the separator plate adjacent to the bead arrangement, when the separator plates of the stack are compressed along the bead arrangements perpendicularly to the flat surface planes of the separator plates, do not splay apart so severely perpendicularly to the flat surface plane of the separator plate or the individual plates, as would be the case without the integrally bonded connections.

The interconnected individual plates of the separator plate can be formed and arranged in such a way that they enclose a cavity arranged between the individual plates for the passage of a coolant. This cavity can be fluidically connected to the bead interior.

At least one of the individual plates can have a structure, on its front side facing away from the other individual plate of the same separator plate, for conducting a reaction medium. For example, the structure can comprise multiple channels, which are stamped in the individual plates. A channel structure in the active region of the separator plate is also referred to as a flow field. The individual plate can have a further channel structure between the flow field and the passage opening in the separator plate, which further channel structure is referred to as a distributor region. The structure for conducting the reaction medium is usually arranged on the side of the bead arrangement facing away from the passage opening in the separator plate. This structure for conducting the reaction medium can be fluidically connected to the bead interior via at least one opening in the individual plate, for example via an opening in the bead flank and a guide channel, connected to the opening, of the previously described type. The reaction medium is thus guided in above-mentioned structure from the outlet or to the inlet of the guide channel, specifically from or to the above-mentioned opening on an outer surface of the separator plate, whereas it is guided in the guide channel between the individual plates, i.e. in the interior of the separator plate.

The opening in the bead arrangement and guide channel of the above-described type connected to the opening can be arranged on a flank of the bead arrangement facing away from the passage opening of the separator plate and/or on a flank of the bead arrangement facing towards the passage opening of the separator plate. Guide channels are preferably arranged on both flanks.

The bead arrangement can be formed at least in part in such a way that the bead flanks each form an angle of less than 70 degrees, preferably of less than 60 degrees, particularly preferably of less than 50 degrees, with a vertical direction oriented perpendicularly to the flat surface plane of the separator plate. The bead roof can additionally have a convex curvature. In this embodiment of the bead arrangement, the bead flanks have a high rigidity, whereas the bead roof is resilient and deformable, in particular when the bead arrangement is compressed.

A height that the bead arrangement in the uncompressed state can be less than 800 μm, less than 600 μm, less than 500 μm, less than 450 μm, or less than 400 μm. As before, the height of the bead arrangement is given by the distance of the highest point of the bead roof from the flat surface plane of the separator plate or from the flat surface plane of the relevant individual plate.

An electrochemical system comprising multiple separator plates of the type proposed herein is additionally proposed. The electrochemical system for example can be a fuel cell system, an electrochemical compressor, a humidifier for a fuel cell system, or an electrolyser. The separator plates of the electrochemical system are typically arranged in a stacked manner and are designed such that the passage openings of the separator plates form at least one media channel, which is designed to feed a medium to the stack or to discharge a medium from the stack.

BRIEF DESCRIPTION OF THE DRAWINGS

Exemplary embodiments of the invention are shown in the drawings and will be explained in greater detail in the following description. Although corners might be shown in part without radii, they usually in practice always have at least a small radii. Some examples of separator plates according to the invention will be provided hereinafter. Here, a multiplicity of advantageous features of a separator plate according to the invention will be presented in conjunction with one another. These individual optional features, however, can develop the present invention not only jointly, but also individually or in combination with other optional features from other examples. Like or similar reference signs will be used hereinafter for like or similar elements, and therefore the description of said elements sometimes is not repeated. In the drawings:

FIG. 4b shows a sectional illustration of the bead feedthrough from FIG. 4a;

FIG. 5a shows a bead feedthrough according to the prior art in a plan view;

FIGS. 5b-c show sectional illustrations of the bead feedthrough from FIG. 6a, wherein regions of the individual plates protrude partially beyond the bead arrangement as the bead arrangement is compressed;

DETAILED DESCRIPTION OF THE INVENTION

Figure 1:
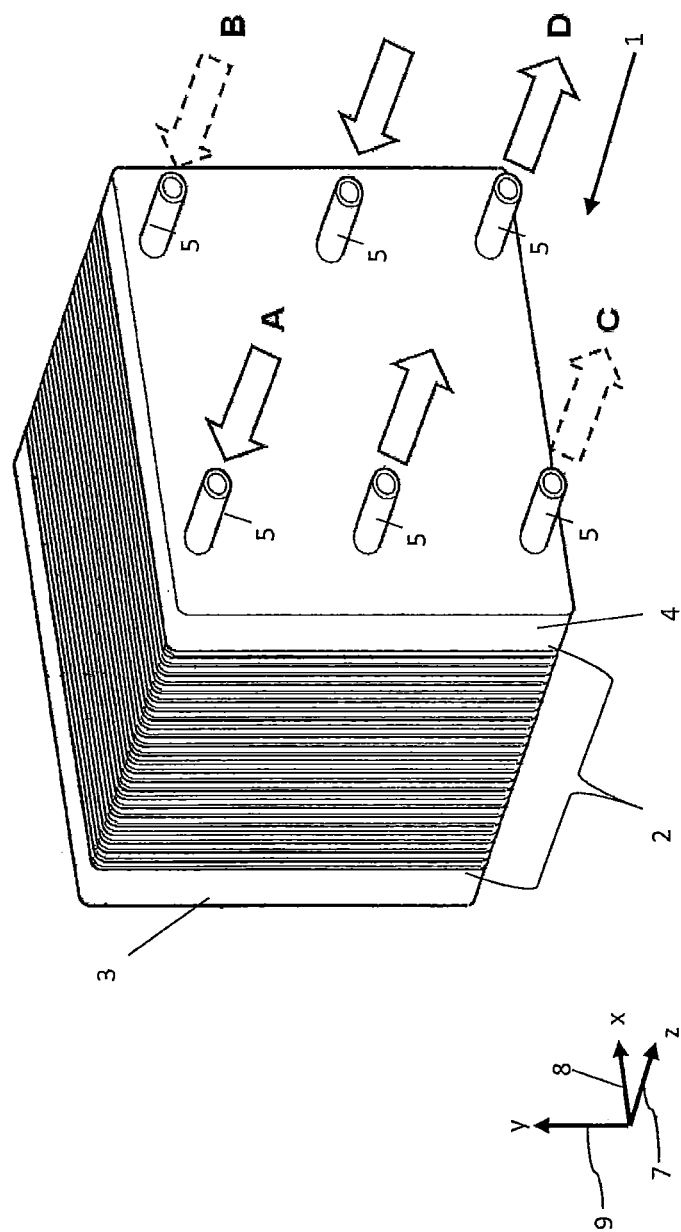
FIG. 1 shows a fuel cell system according to the invention with multiple stacked separator plates in a perspective view.

FIG. 1 shows an electrochemical system 1 according to the invention, comprising a stack 2 of separator plates of identical design, which are stacked along a z-direction 7 and are clamped between two end plates 3, 4. The separator plates are formed here as bipolar plates and each comprise two individual plates connected to one another. In the present example, the system 1 is a fuel cell system. Each two adjacent bipolar plates of the stack 2 thus enclose therebetween an electrochemical cell designed to convert chemical energy into electrical energy. In alternative embodiments the system 1 can also be formed as an electrolyser, electrochemical compressor, or as a humidifier for a fuel cell system. Separator plates are likewise used in those electrochemical systems. The structure of these separator plates corresponds to the structure of the bipolar plates explained here in greater detail, even if the media guided, on or through the separator plates differ.

The z-axis 7, together with an x-axis 8 and a y-axis 9, spans a right-handed Cartesian coordinate system. The end plate 4 has multiple ports 5, by means of which media can be fed to the system 1 and by means of which media can be discharged from the system 1. These media that can be fed to the system 1 and that can be discharged from the system 1 can comprise, for example, fuels such as molecular hydrogen or methanol, reaction gases such as air or oxygen, reaction products such as steam or oxygen-depleted air, or coolant such as water and/or glycol.

Figure 2:
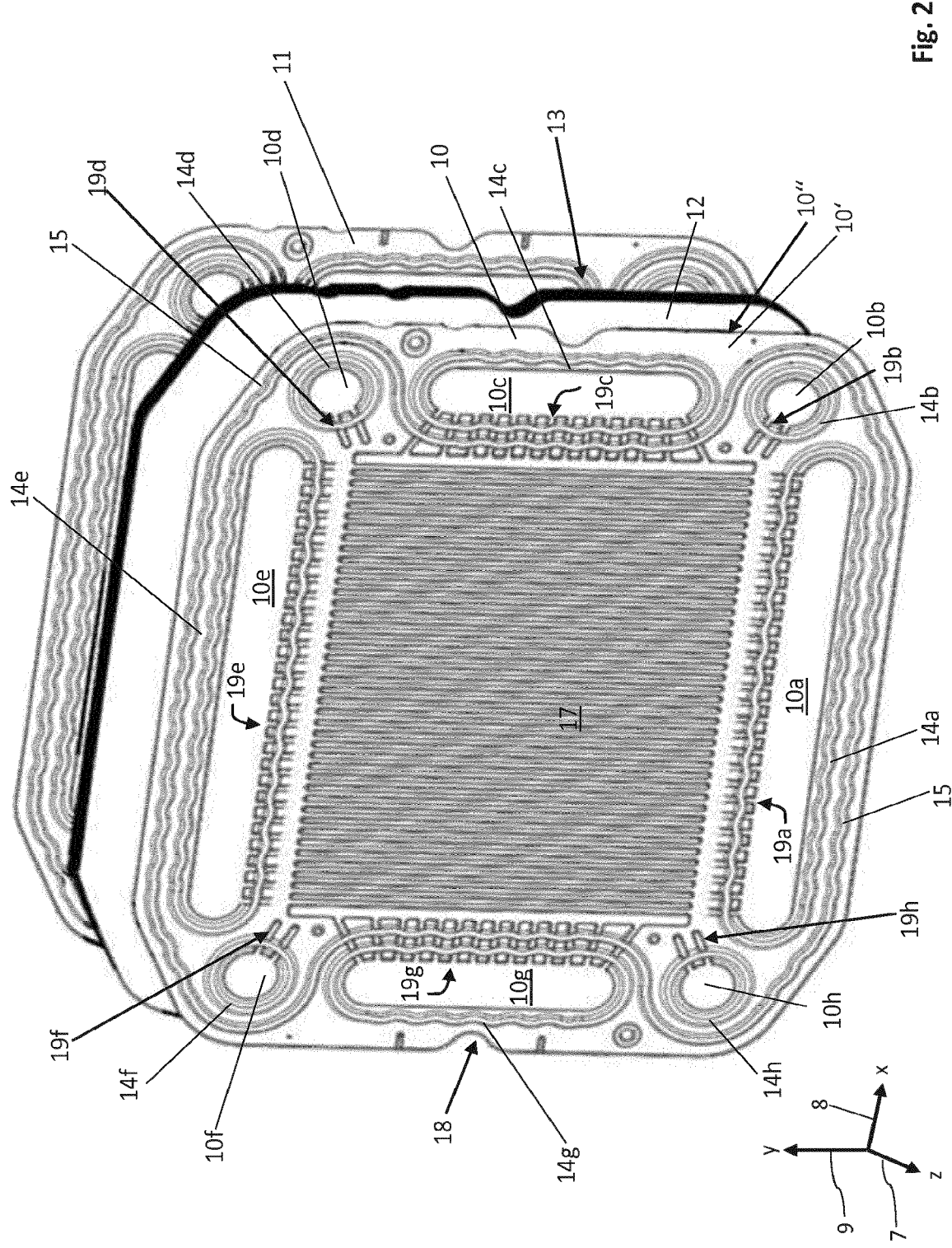
FIG. 2 shows a perspective view of two directly adjacent separator plates according to the invention of the stack from FIG. 1 and a membrane electrode unit arranged therebetween.

FIG. 2 shows two directly adjacent separator plates 10, 11 of the stack 2 from FIG. 1. Here and hereinafter, repeating features are denoted in each case by the same reference sign. The separator plates 10, 11 are formed identically. Hereinafter, only the separator 10 will therefore be described in detail. It is thus representative for the separator plates of the stack 2.

The flat surface plane of the separator plate 10 is oriented along the x-y plane. Here, the separator plates 10 are formed from two metal individual plates 10', 10'' joined together (see also FIGS. 8a and 8b). In FIG. 2, however, only the first individual plate 10' of the separator plate 10 facing towards the viewer is visible. The individual plates 10', 10'' of the separator plate 10 are fabricated from stainless steel sheets, which for example each have a thickness, defined perpendicularly to the flat surface plane of the individual plates, of 80 μm. The individual plates 10', 10'' can be welded to one another along their rear sides facing towards one another, in particular welded, soldered or adhesively bonded to one another in part, in order to form the separator plate 10. For example, the individual plates 10', 10'' can be connected by connections produced by laser welding.

A membrane electrode unit (membrane electrode assembly, MEA) 12 is arranged between the separator plates 10, 11. The MEA 12 can comprise a polymer electrolyte membrane (PEM) and one or more gas diffusion layers (GDL). The GDL are usually oriented towards the separator plates 10, 11 and for example are formed as carbon mats. The sides of the separator plates 10, 11 facing towards one another enclose an electrochemical cell 13 in the compressed state. In the case of humidifiers for fuel cell systems, the cell 13 is formed by a substantially gas-impermeable, but water-permeable membrane, which can be supported by supporting media, and by at least one diffusion medium, preferably a diffusion medium on either side, formed from a textile or carbon mat.

The separator plate 10 has multiple passage openings 10a-h. The MEA 12 has corresponding passage openings, which are aligned with the passage openings 10a-h of the separator plate 10 and with corresponding passage openings of the other separator plates of the stack 2, so that the passage openings form media channels once the stack 2 has been compressed, which media channels are each fluidically connected to one of the ports 5 from FIG. 1 respectively. These media channels are used to feed media into the electrochemical system 1 and to discharge media from the electrochemical system 1.

In order to seal off the passage openings 10a-h or in order to seal off the media channels formed by the passage openings 10a-h, bead arrangements are formed in the separator plate 10, which bead arrangements are arranged around the passage openings 10a-h. The first individual plate 10' of the separator plate 10 facing away from the separator plate 11 thus has bead arrangements 14a-h around the passage openings 10a-h. The bead arrangements 14a-h encircle the passage openings 10a-h, in each case fully. The second individual plate 10" of the separator plate 10 facing towards the separator plate 11 and hidden from view in FIG. 2 has corresponding bead arrangements around the passage openings 10 a-h. An additional bead arrangement 15 of the separator plate 10 encircles the passage openings 10a-b, 10d-f and 10h fully.

The bead arrangements of the separator plate 10 are each formed here in one piece with the individual plates 10', 10". The bead arrangements of the individual plates 10', 10" are usually formed integrally, in particular stamped, in the individual plates. The bead arrangements formed in the individual plates, in the uncompressed state, each have a height perpendicularly to the flat surface plane of the individual plates 10', 10" of just 450 μm, or even of just 400 μm. The height of the bead here in each case denotes the distance of the highest point of the bead roof from the flat surface plane of the relevant individual plate on the surface pointing towards the bead roof. This extremely small bead height contributes advantageously to the compactness of the stack 2 of the system 1.

It can also be seen in FIG. 2 that the first individual plate 10' of the separator plate 10, on its front side facing away from the second individual plate 10" of the separator plate 10, has a structure 17 for conducting reaction medium. The structure 17 comprises multiple channels, which are stamped in the individual plate 10'. The structure 17 is surrounded fully on all sides by the bead arrangement 15, so that the bead arrangement 15 seals the structure 17 with respect to the surrounding environment. The structure 17 is part of an active region of the individual plate 10'. This active region delimits a further electrochemical cell, which is arranged between the separator plate 10 and a further separator plate, which is not illustrated in FIG. 2 but is arranged directly adjacently to the separator plate 10 in the positive z-direction 7. The second individual plate 10" of the separator plate 10 has, on its front side facing away from the first individual plate 10', a structure corresponding to the structure 17 for conducting reaction medium.

The individual plates 10', 10" are formed and arranged in such a way that they enclose therebetween a cavity 18 for passage of a coolant. The cavity 18 is in particular arranged between the individual plates 10', 10" in such a way that heat from the active regions of the individual plates 10', 10" can be dissipated by means of the coolant guided through the cavity 18.

The individual plates 10', 10" also have feedthroughs 19a-h, which are designed for the metered passage or conductance of media (for example fuels, reaction gases, reaction products or coolants) through the bead arrangements 14a-h, 15. Some of the feedthroughs 19a-h, specifically the feedthroughs 19c and 19g, produce a fluidic connection between the passage openings 10c and 10g (or the media channels formed thereby) and the cavity 18 between the individual plates 10', 10". Some of the feedthroughs, specifically the feedthroughs 19a and 19e, produce a fluidic connection between the passage openings 10a and 10e (or the media channels formed thereby) and the flow field 17, facing towards the viewer, of the active region of the individual plate 10' of the separator plate 10. The other feedthroughs 19b, 19d, 19f and 19h produce a fluidic connection between the passage openings 10b, 10d, 10f and 10h (or the media channels formed thereby) and the flow field, facing away from the viewer, of the active region of the second individual plate 10" of the separator plate 10. Details of the feedthroughs 19a-h will be explained with reference to the following figures.

Figure 3:
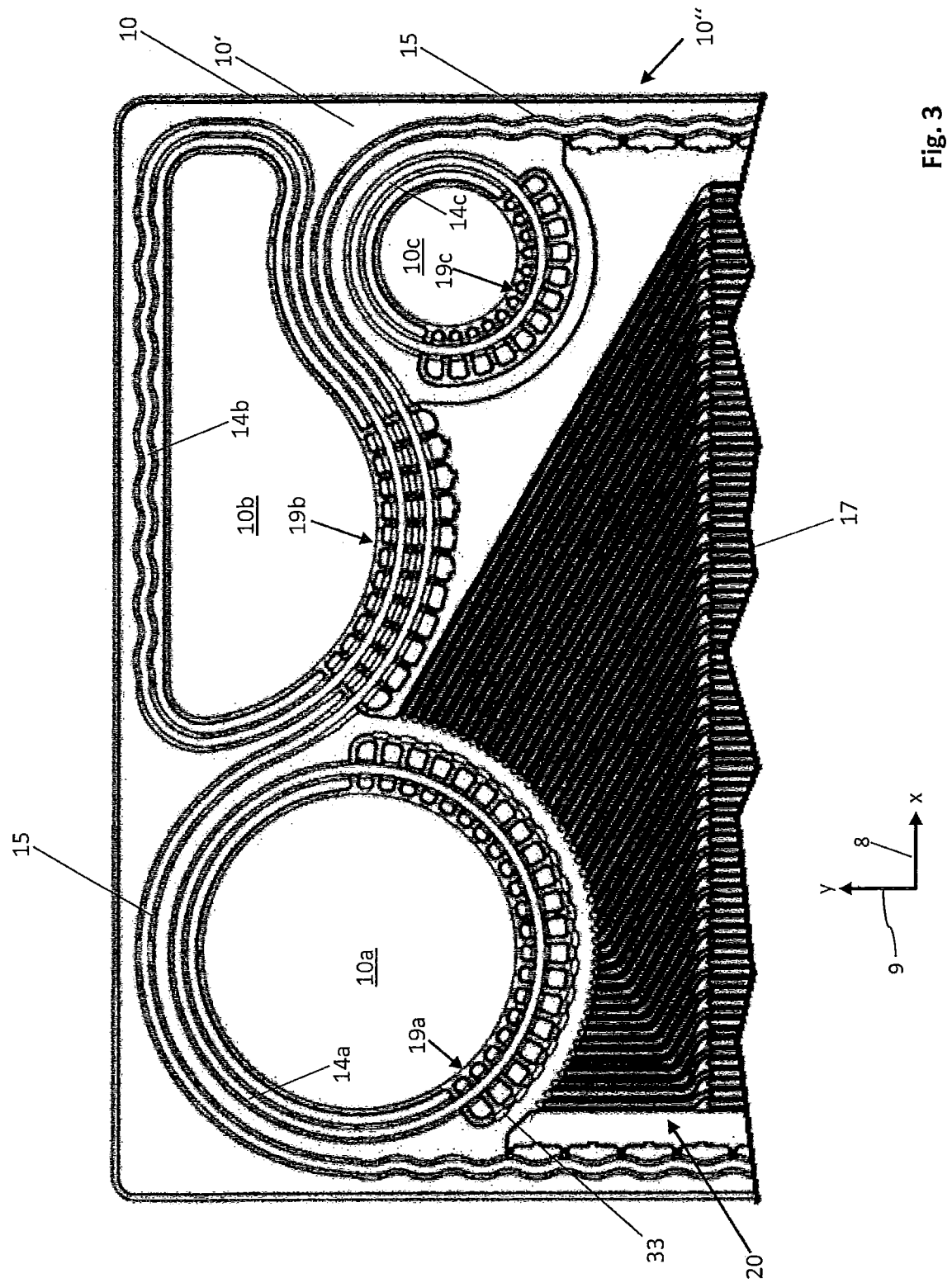
FIG. 3 shows a further exemplary embodiment of a separator plate according to the invention in a plan view.

FIG. 3 shows a modified embodiment of the separator plate 10 with the metal individual plates 10', 10" joined together. The front side of the first individual plate 10' is facing towards the viewer. The passage openings 10a-c in the separator plate 10 can be seen, as can the bead arrangements 14a-c arranged around the passage openings 10a-c in order to seal the passage openings 10a-c, these bead arrangements being stamped in the first individual plate 10'. The bead arrangement 15 for sealing the active region of the first individual plate 10' is shown in part. The embodiment of the separator plate 10 according to FIG. 3 additionally has a distributor structure 20. This comprises multiple channels stamped in the front side of the individual plate 10' and produces a fluidic connection between the passage opening 10a and the active region of the individual plate 10', which in FIG. 3 is connected to the distributor structure 20 at the lower edge of the image. The bead arrangements 14a-c in turn have feedthroughs 19a-c for conducting media through the bead arrangements 14a-c, wherein it is clear that the medium of the passage opening 10b—this being coolant here in particular—must pass through both the bead 14b and the bead 15; it is guided continuously on the side of the individual plate 10' facing away from the viewer. The media guided from the passage opening 10a, between the individual plates 10', 10", and through the opening 19a transversely to the bead arrangement 14a, enters the distributor structure 20 facing towards the viewer via the opening 33 (for example see FIGS. 6 to 8). The media discharged from the distributor structure (not visible) on the opposite surface of the separator plate 10 enters a guide channel between the individual plates 10' and 10" through an opening formed in the second individual plate 10", crosses the bead 14c via the feedthrough 19c, and flows on into the passage opening 10c.

Figure 4A:
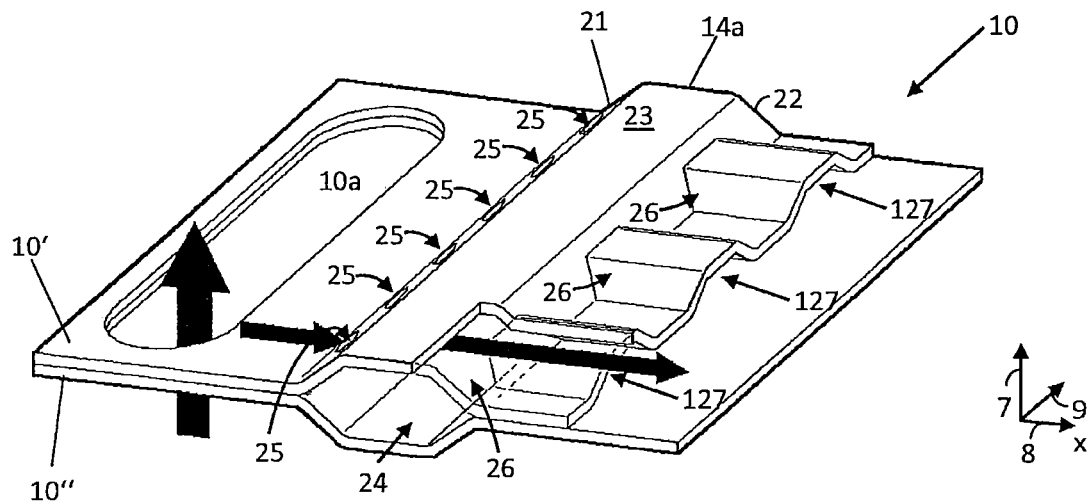
FIG. 4a shows a perspective view of a feedthrough through a bead arrangement of a separator plate with guide channels connected to the bead arrangement in accordance with the prior art.

FIG. 4a shows a detail of the separator plate 10 in a perspective view. The bead arrangement 14a stamped in the first individual plate 10' has two bead flanks 21, 22 and a bead roof 23. On the rear side of the individual plate 10' facing towards the second individual plate 10", a bead interior 24 is arranged between the bead flanks 21, 22 and the bead roof 23 and is delimited by the bead flanks 21, 22 and the bead roof 23. The bead flank 21 facing towards the passage opening 10a has multiple openings 25 for conducting a medium through the bead flank 21. The passage opening 10a is fluidically connected to the bead interior 24 via the openings 25. The bead flank 22 facing away from the passage opening 10a has openings 26 for conducting a medium through the bead flank 22.

Figure 4B:
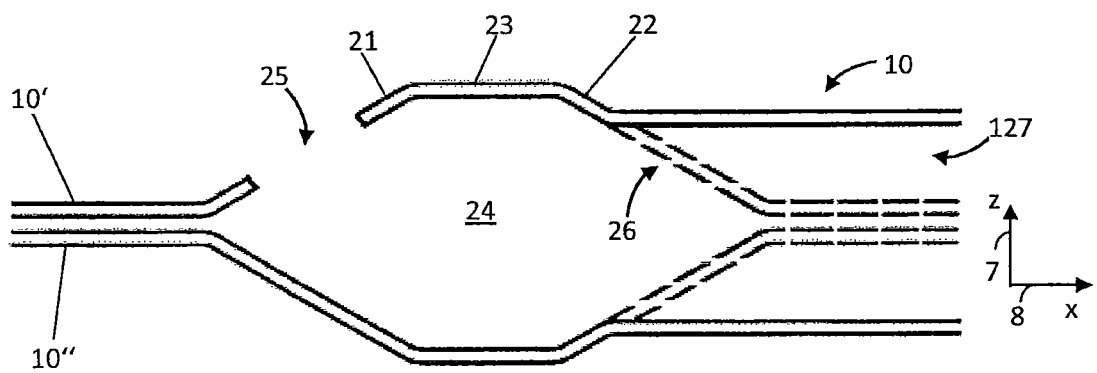

On the exterior of the bead arrangement 14a facing away from the second individual plate 10", the openings 26 are connected to guide channels 127, which are not according to the invention and which are fluidically connected via the openings 26 to the bead interior 24. A medium guided in the media channel 10a can thus be guided through the bead arrangement 14a via the openings 25, the bead interior 24, the openings 26 and the channels 127, and for example can be selectively guided into the active region of the individual plates 10', as is indicated on the basis of the arrows. The guide channels 127 not according to the invention have a constant height, wherein the height of the guide channels 127 of the individual plate 10' is given in each case by the distance of the channel roof 30 from the flat surface plane of the individual plate 10'. FIG. 4b shows a sectional illustration of the bead arrangement 14a according to FIG. 4a, wherein the plane of section is oriented along the x-z plane and runs in the longitudinal direction through a guide channel 127 not according to the invention.

In order to make the stack 2 of the separator plates of the system 1 as compact as possible, it is desirable to form the bead arrangement 14a and the other bead arrangements of the separator plate 10 as flat as possible. The openings 25, 26 in the bead flanks 21, 22, however, can be detrimental to the stability and resilience and thus the sealing effect of the bead arrangement 14a. This could be compensated for, as appropriate, by making the openings 25, 26 smaller. A reduction in size of this kind, however, would also result in an undesirable reduction in size of the media flow through the bead arrangement.

FIG. 5a shows a plan view of a bead feedthrough not according to the invention. In particular, the bead feedthrough according to FIG. 5a has guide channels 127, not according to the invention, of constant height and constant width. FIGS. 5a-c each show two sectional illustrations of the arrangement according to FIG. 5a, wherein in each case the planes of section run one perpendicularly to the flat surface plane of the individual plate 10' and one perpendicularly to the straight extent of the bead arrangement 14a. The plane of section runs along the straight line A-A shown in FIG. 5a. The upper image of FIGS. 5b-c shows the separator plate 10 in each case in the uncompressed state. The lower image of FIGS. 5b-c shows the separator plate 10 in each case in the compressed state, wherein a force exerted onto the bead arrangement 14a perpendicularly to the flat surface plane of the separator plate 10 or perpendicularly to the flat surface plane of the individual plates 10', 10" is indicated by arrows 44.

The lower images of FIGS. 5b-c show that the individual plates 10', 10", under compression, splay apart from one another in regions 46 distanced from the bead arrangement 14a, in such a way that the individual plate 10' protrudes in part beyond the height 45 of the bead arrangement 14a in the region 46. In this case, for example, the membrane electrode unit 12 arranged between adjacent separator plates of the stack 2 could be damaged.

This undesirable effect is particularly heavily pronounced in the arrangement according to FIG. 5b. In the exemplary embodiment of 5b, there are no connections formed between the two individual plates 10', 10" of the separator plate 10 in the regions between the channels 127. In the arrangement according to FIG. 5c, integrally bonded connections 43 are formed in part between the individual plates 10', 10" of the separator plate 10 in the planar regions 34 of the separator plate 10 arranged between adjacent channels 127. In FIG. 5a the position of one of these integrally bonded connections 43 has been emphasised by way of example. For example, the integrally bonded connection 43 can be an adhesively bonded connection, a soldered connection, or a welded connection, in particular a connection produced by laser welding. The comparison between the images of FIGS. 5b and 5c shows that the splaying apart of the individual plates 10', 10" away from one another can be reduced by the integrally bonded connection 43 according to FIG. 5c. However, the lever force exerted onto the regions 46 as a result of the compression of the bead arrangement is also still of such a magnitude even in the arrangement according to FIG. 5c that the individual plate 10' protrudes in part beyond the height 45 of the bead arrangement 14a in the regions 46. An embodiment according to the invention of the feedthroughs 19a-h through the bead arrangements 14a-h, 15 according to FIGS. 2 and 3, which ensures a sufficiently large media flow through the bead arrangements 14a-h, 15 without detriment to the stability and resilience of the bead arrangements 14a-h, 15, will be presented hereinafter by way of example with reference to FIGS. 6-9 for the bead feedthrough 19a through the bead arrangement 14a of the individual plate 10' of the separator plate 10.

Figure 6A:
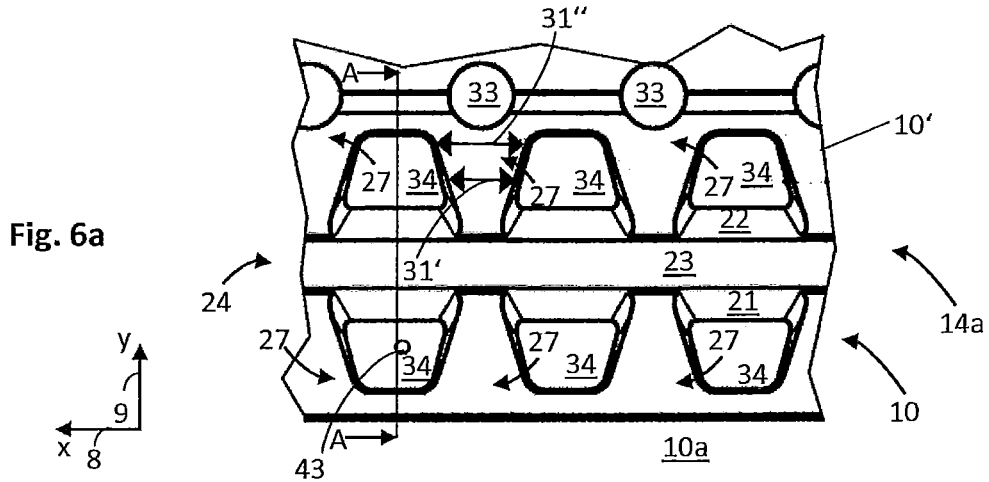
FIG. 6a shows a bead feedthrough according to the invention in a plan view.

FIG. 6a thus shows, in contrast to FIG. 5a, an embodiment of a bead feedthrough 19a according to the invention, in which multiple guide channels 27 according to the invention are connected to the bead flanks 21, 22 on either side of the bead arrangement 14. The guide channels 27 are again fluidically connected to the bead interior 24 via openings 25 in the bead flank 21 and via openings 26 in the bead flank 22. For the sake of clarity, the openings 25, 26 have not been shown separately here. As before, the height of the guide channels 27 increases in the direction of the bead arrangement 14a, in each case at least in sections, here in particular linearly. For example, the guide channels 27 according to FIG. 6a are each formed similarly to the guide channels 27 shown in FIG. 5a or 5d.

It can also be seen in FIG. 6a that a width of the guide channels 27 defined parallel to the flat surface plane of the individual plate 10' decreases in the direction of the bead arrangement 14a at least in sections. Here, the guide channels 27 each widen in a fan-like manner starting from the bead flanks 21, 22. The width of the guide channels 27 defined parallel to the straight line of the bead arrangement 14a thus decreases in the direction of the bead arrangement 14a linearly in regions. Shown by way of example are a first width 31' of a guide channel 27 at a first distance from the bead arrangement 14a and a second width 31" of the same guide channel 27 at a second distance from the bead arrangement 14a, wherein the first distance is smaller than the second distance. The first width 31' is smaller than the second width 32".

The width of the guide channels 27 decreases in the direction of the bead arrangement 14a, in each case approximately to the same extent as the increase in the height of the guide channels 27 in the direction of the bead arrangement 14a, such that a cross-sectional area of the guide channels 27 along the extent of the guide channels 27 is substantially constant. For example, the guide channels 27 are designed such that their cross-sectional area, at least along the middle 25% of the extent of the guide channel 27, preferably along the middle third along their extent, changes by 20% at most or by 15% at most.

Since the guide channels 27 according to FIG. 6a are designed such that their height decreases away from the bead arrangement 14a at least in portions, the individual plates 10', 10" are advantageously prevented from protruding into the regions 46 distanced from the bead arrangement 14a, beyond the height 45 of the bead arrangement 14a, as the bead arrangement 14a is compressed. In particular, the embodiment according to the invention of the guide channels 27 according to FIG. 6a means that the individual plates 10', 10" have a smaller distance from one another in the regions 46 perpendicular to the flat surface plane of the individual plates 10', 10". The embodiment according to the invention of the guide channels 27 thus counteracts the splaying apart of the individual plates 10', 10" away from one another into the regions 46 as the bead arrangement 14a is compressed. Since the guide channels according to FIG. 6a are additionally designed such that their width 31', 31" increases away from the bead arrangement 14a, there is no detriment to the fluid transport through the guide channel.

As already explained with reference to FIG. 5c, the splaying apart of the individual plates 10', 10" into the regions 46 can be counteracted additionally by forming integrally bonded connections in regions at least in some of the regions 34 between adjacent guide channels 27. The position of an integrally bonded connection 43 of this kind is shown by way of example in FIG. 6a. For example, the connection can be an adhesively bonded connection, a soldered connection or a welded connection, in particular a connection produced by laser welding. The illustration of FIG. 6c shows that a deformation of the individual plates 10', 10" in the regions 46 under compression of the bead arrangement 14a can be completely or almost completely eliminated by the embodiment according to the invention of the guide channels 27 and by the additional forming of integrally bonded connections 43 between the individual plates 10', 10" in the regions 34 between adjacent guide channels 27.

Figure 6B:
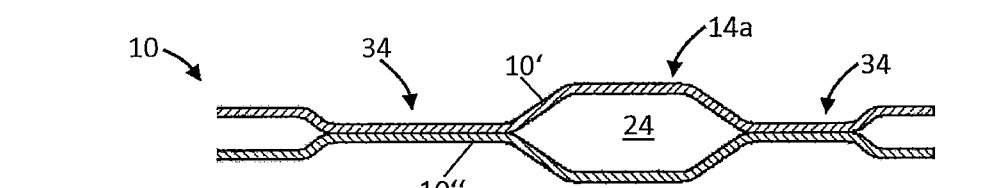
FIGS. 6b-c show sectional illustrations of the bead opening from FIG. 6a, wherein the individual plates, as a result of the embodiment of the guide channels according to the invention, do not protrude beyond the bead arrangement as the bead arrangement is compressed.
Figure 6B:
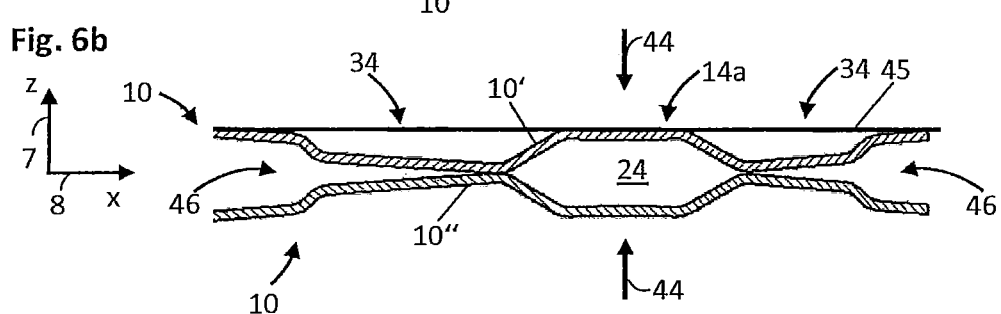
Figure 6C:
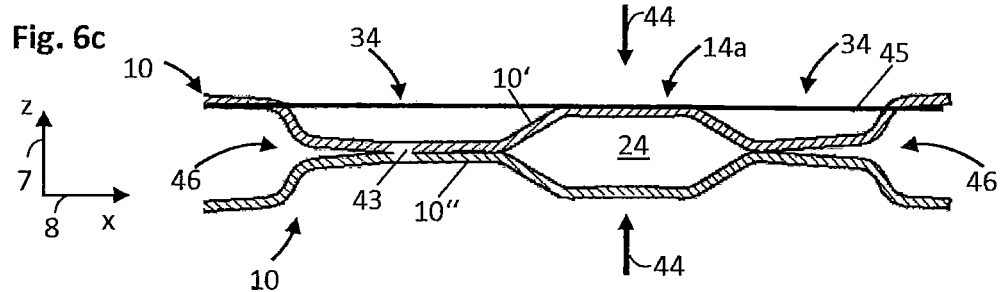

By contrast, FIG. 6b shows an example in which there is no integrally bonded connection between the guide channels 27, yet the splaying apart of the individual plates 10', 10" is nevertheless effectively reduced.

FIGS. 7a-e in turn show modified embodiments of the feedthrough 19a according to the invention through the bead arrangement 14a of the individual plates 10'. The bead feedthrough 19a according to FIGS. 7a-d differs from the bead feedthrough 19a according to FIG. 6a in that the bead arrangement 14a according to FIG. 6a runs in a straight line, whereas the bead arrangements 14a according to FIGS. 7a-e each have a wave-like extent, at least in part, in particular in the form of a sine curve.

Figure 7A:
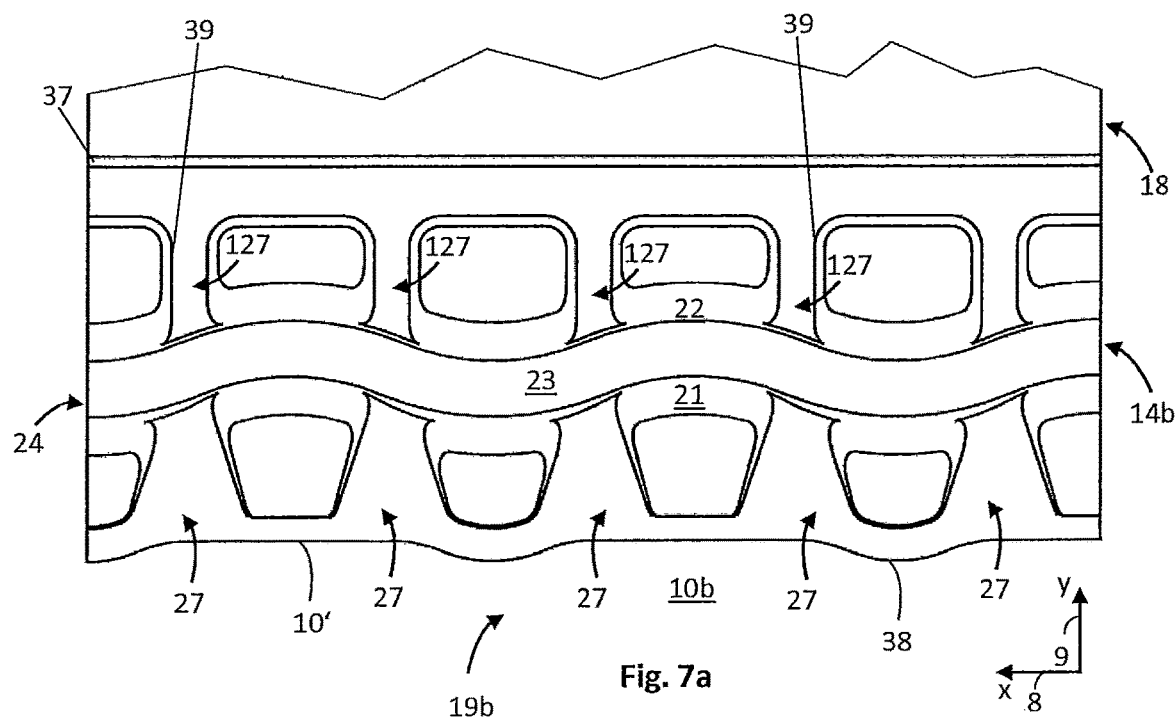
FIGS. 7a-e show further embodiments of a bead feedthrough with guide channels according to the invention, in each case in a plan view.

In FIG. 7a the bead feedthrough 19b has guide channels 27 according to the invention only on the bead flank 21 facing towards the passage opening 10b, which guide channels are each connected to the bead flank 21. Merely for the sake of clarity, the openings 25, 26 in the bead flanks 21, 22 have not been shown separately in FIGS. 7a-d. In FIG. 7a the guide channels 27 are fluidically connected to the bead interior 24 via the openings 25 in the bead flank 21. The height of the guide channels 27 increases in the direction of the bead arrangement 14b linearly in sections. The width of the guide channels 27 decreases to the same extent in the direction of the bead arrangement 14b, so that the guide channels have a substantially constant cross-section. By contrast, guide channels 127 of constant height are arranged on the bead flank 22 facing away from the passage opening 10b and produce a fluidic connection between the bead interior 24 and the previously described cavity 18 between the individual plates 10', 10". The guide channels 27 in FIG. 7a transition on each side of the radii 39 into the cavity 18 via a stepped end 37. The guide channels 27 are delimited in the direction of the passage opening 10a by an inner edge 38 of the individual plate 10' protruding in the region of the wave trough. The guide channels are shortened by this course of the inner edge 38, and therefore the splaying of the individual plates 10', 10" away from one another at the inner edge 38 is further reduced.

Figure 7B:
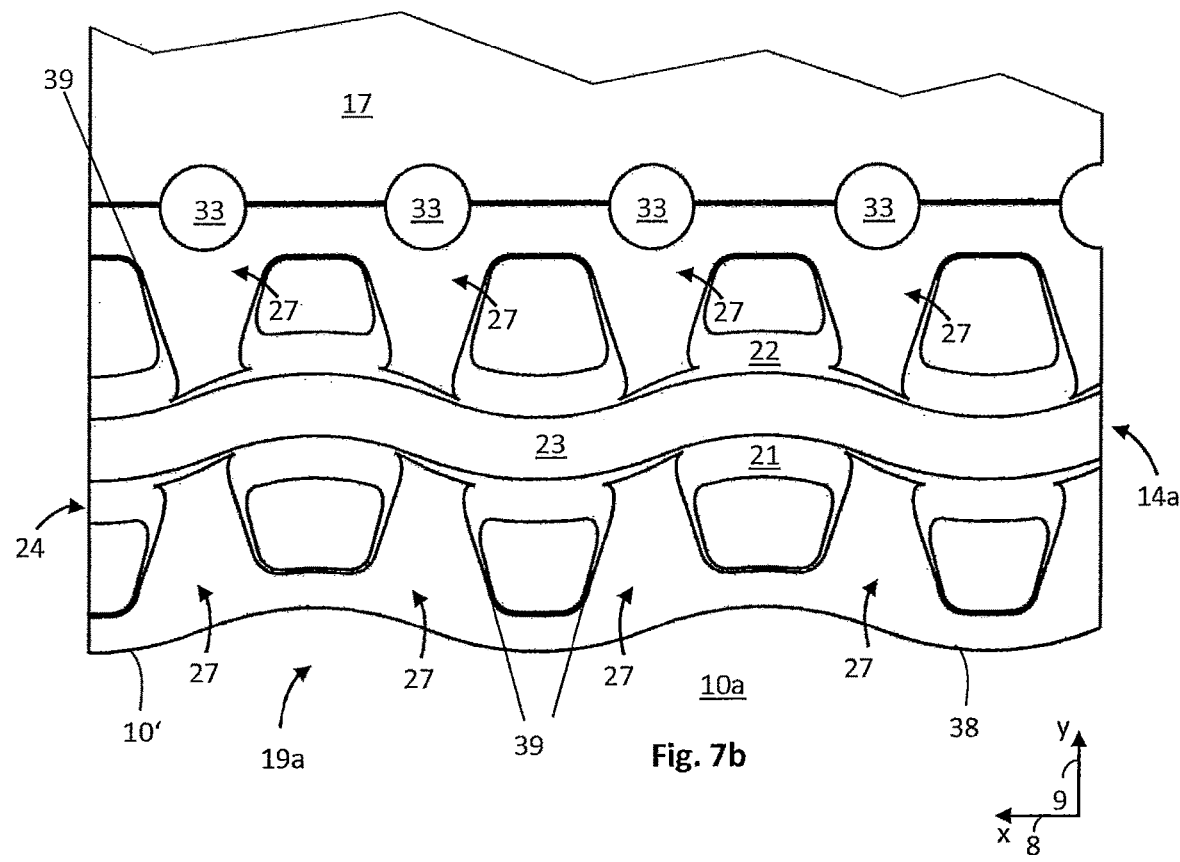

The bead feedthrough 19a according to FIG. 7b differs from the bead feedthrough 19b according to FIG. 7a in particular in that the guide channels 27 according to the invention are arranged on both bead flanks 21, 22. The height of the guide channels 27 increases in the direction of the bead arrangement 14a linearly in sections. The width of the guide channels 27 decreases in the direction of the bead arrangement 14a to the same extent, such that the guide channels have a substantially constant cross-section. The guide channels 27, on the side of the bead arrangement 14a facing away from the passage opening 10a, each have an inlet or outlet at each of their ends facing away from the bead arrangement 14a, said inlet or outlet having the form of a passage opening 33 in the individual plate 10'. The guide channels 27 for example are fluidically connected to the active region of the individual plate 10' via these openings.

The inner edge 38 of the individual plate 10' likewise runs in a wave-like manner in FIG. 7b, wherein the bead arrangement 14a and the inner edge 38 have the same wavelength. The guide channels 27 are thus all of equal length and thus enable homogeneous conditions. Whereas the wave form of the inner edge here corresponds substantially to a sine wave, a periodic juxtapositioning of trapezoidal inner edge portions is also possible.

Figure 7C:
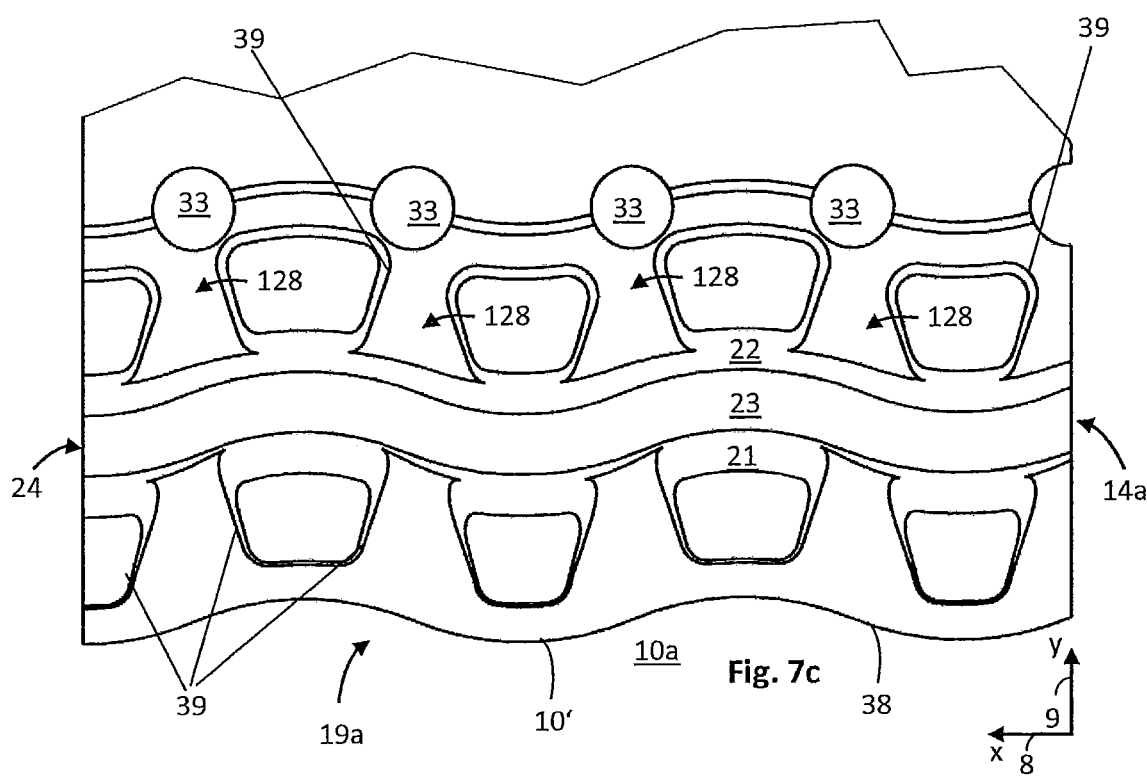

The bead feedthrough 19a according to FIG. 7c differs from the bead feedthrough 19 according to FIG. 17b in that guide channels 128 are arranged on the bead flank 22 and widen in a fan-like manner in the direction of the bead arrangement 14a at least in sections. The height of the guide channels 128 decreases in the direction of the bead arrangement 14a to the same extent as their width increases in the direction of the bead arrangement 14a, as defined parallel to the flat surface plane of the individual plates 10', such that the cross-sectional area of the guide channels 128 is substantially constant along their extent.

Figure 7D:
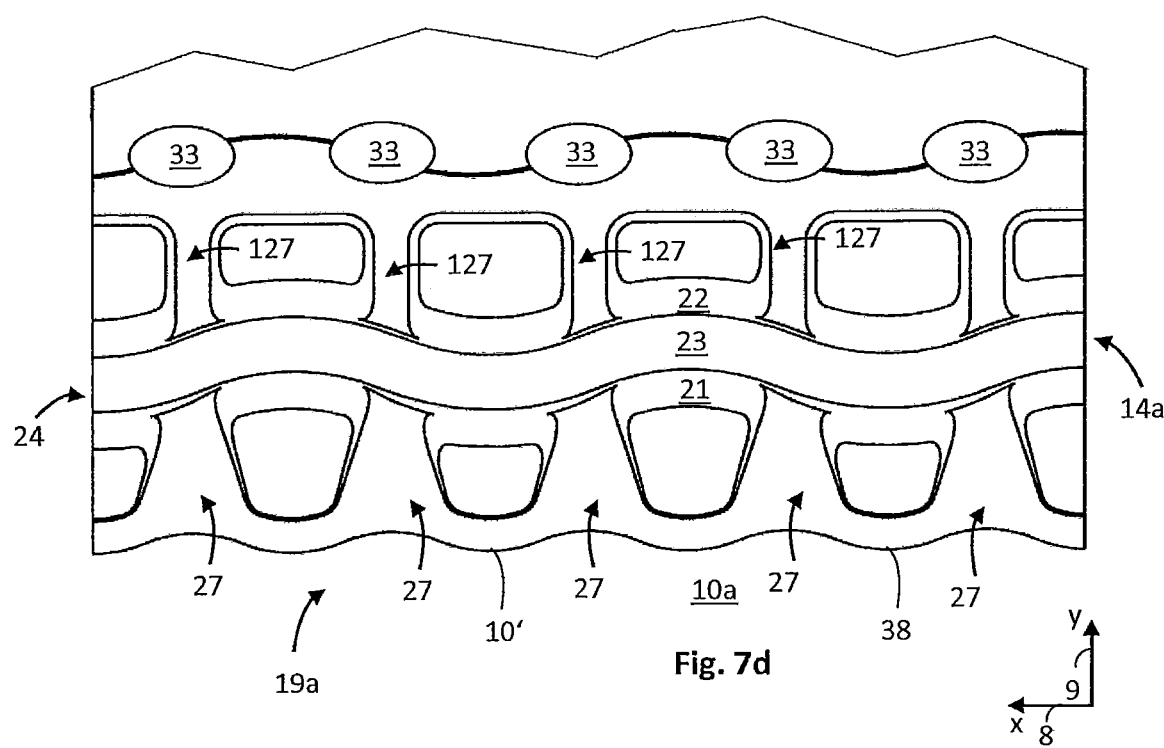

The bead feedthrough 19a according to FIG. 7d differs from the bead feedthrough 19a according to FIG. 7b in that straight guide channels 127 of constant height are arranged on the bead flank 22. The inner edge 38 of the individual plate 10' again has a wave-like extent. In FIG. 7d, however, the wavelength of the wave-like extent of the inner edge 38 corresponds to exactly half the wavelength of the wave-like extent of the bead arrangement 14a. This results in particularly short guide channels 27, such that the splaying apart of the individual plates 10', 10" in the region of the inner edge 38 is further reduced.

Figure 7E:
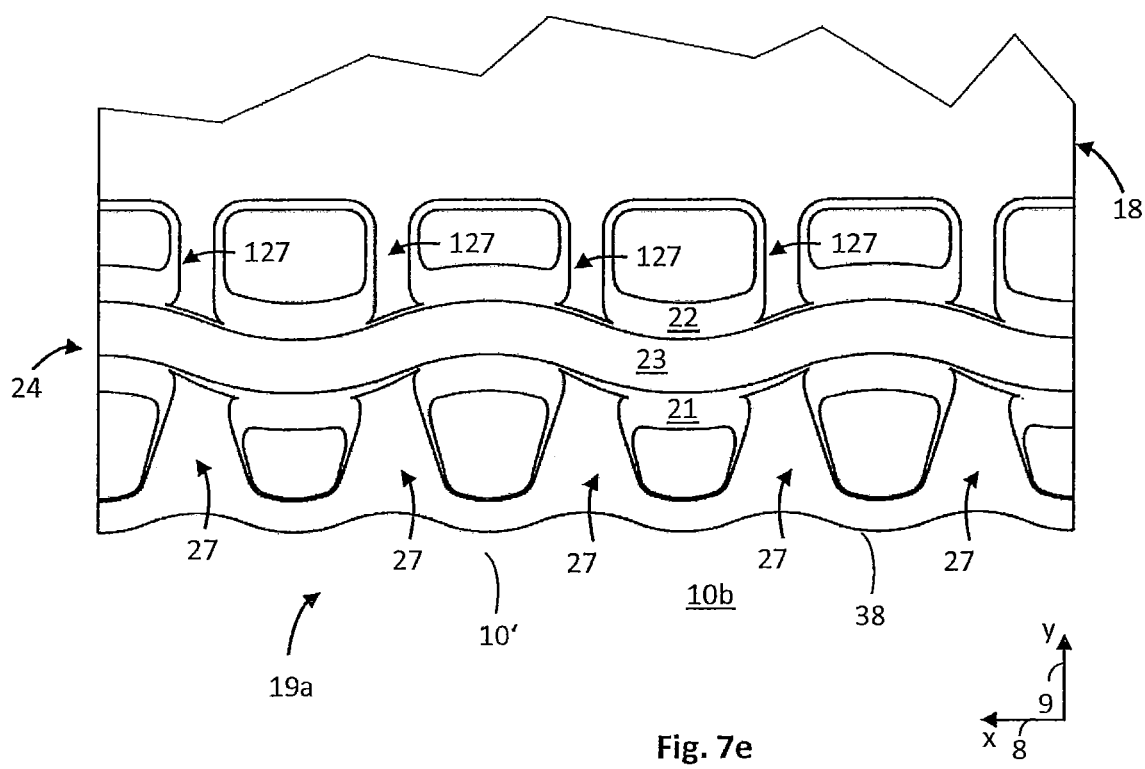

FIG. 7e shows a further embodiment, which differs from that of FIG. 7a in that there is no step 37 provided in the region of the transition to the flow field 17 or into the cavity 18. The media transfers directly between the guide channel 127 and the flow field 17. The edge of the passage opening 10b is formed comparably to the edge of the passage opening 10a in the exemplary embodiment of FIG. 7d.

In the embodiment of FIGS. 7a-7e, the guide channels 27 according to the invention each transition into the bead flanks in the regions of the inflection points of the wave-like extent of the bead arrangement 14a.

Figure 8A:
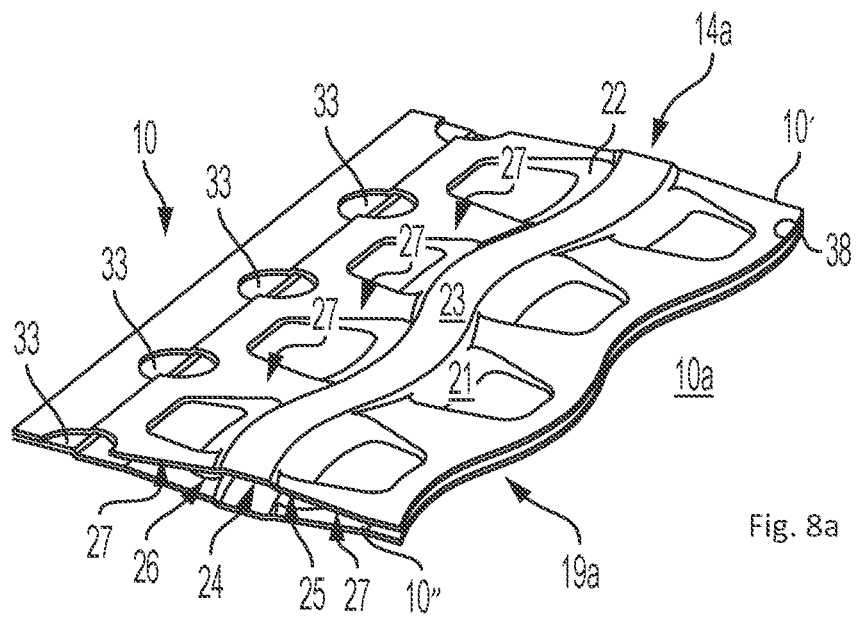
FIG. 8a shows a perspective view of the bead feedthrough according to FIG. 6b, cut along a guide channel according to the invention.
Figure 8B:
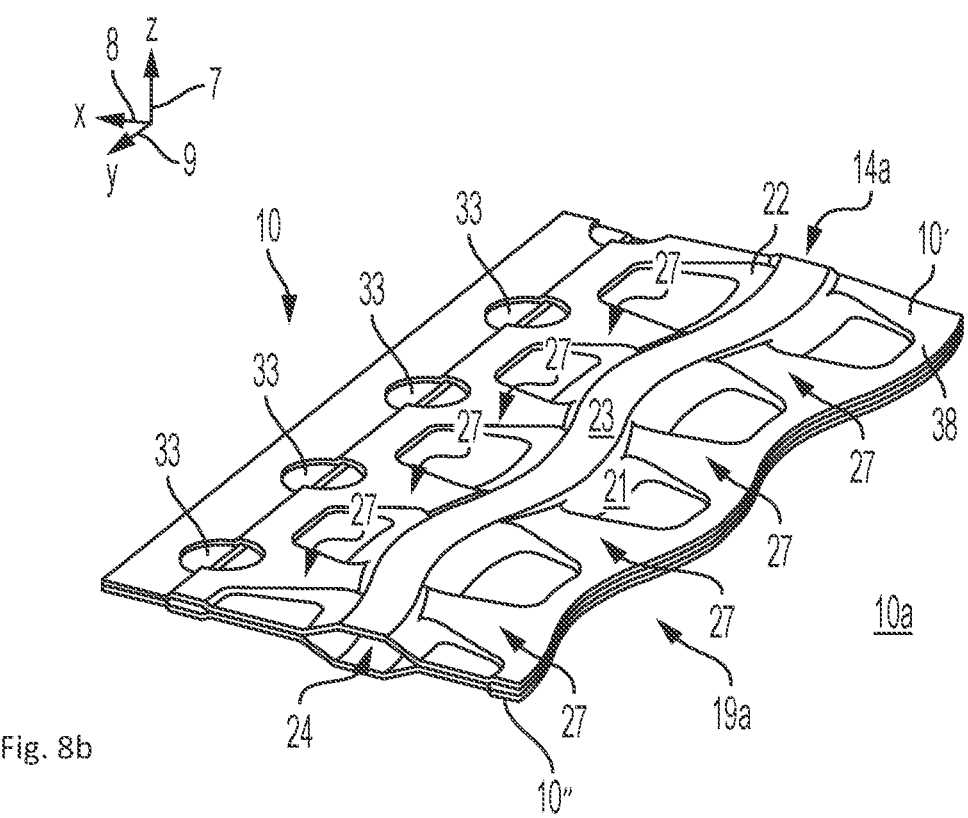
FIG. 8b shows a perspective view of the bead feedthrough according to FIG. 6b, cut along a region between adjacent guide channels.
Figure 9A:
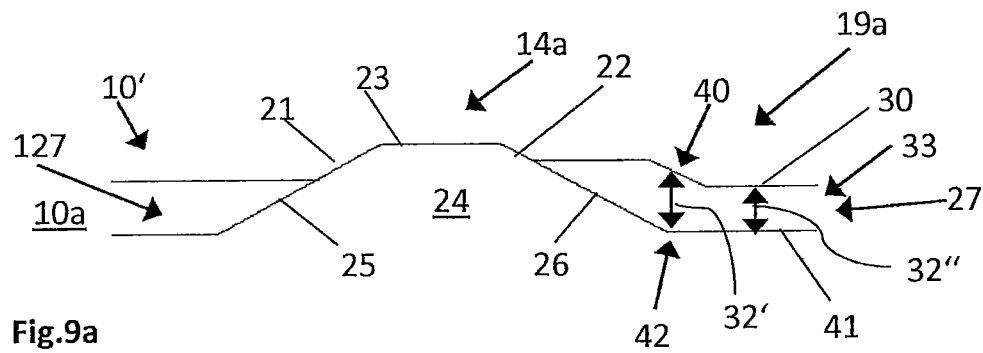
FIGS. 9a-d show sectional illustrations of bead feedthroughs with a guide channel according to the invention, the height of which increases in the direction of the bead arrangement at least in sections.

FIGS. 8a and 8b show the bead feedthrough 19a according to FIG. 7b in a perspective illustration. In addition to the first individual plate 10', the second individual plate 10" is also shown and is joined to the first individual plate 10' to form a separator plate or bipolar plate 10. In order to show the three-dimensional structure of the bead feedthrough 19a, the separator plate 10 has been shown in FIGS. 8a and 8b cut at the lower end of the image, in each case at a different point. In both cases the plane of section runs perpendicular to the flat surface plane (x-y plane) of the separator plate 10 and substantially perpendicular to the extent of the bead arrangement 14a. In FIG. 9a the plane of section runs at the lower edge of the image along the longitudinal direction of two guide channels 27 according to the invention. By contrast, in FIG. 9b the plane of section runs at the lower edge of the image in the region between two adjacent guide channels 27. It can be clearly seen in FIG. 9a that the passage opening 10a and the inlets or outlets 33 at the ends of the guide channels 27 facing away from the bead arrangement 14a, in each case in the upper image half, are fluidically connected via the guide channels 27 on both sides of the bead arrangement 14a, the openings 25, 26 in the bead flanks 21, 22, and via the bead interior 24.

FIGS. 9a-d each show a sectional view of various embodiments of a bead feedthrough 19a through the bead arrangement 14a, wherein the plane of section is oriented perpendicularly to the flat surface plane of the individual plates 10' and perpendicularly to the direction of extent of the bead arrangement 14*a*. In each case, the bead arrangement 14*a* with the bead flanks 21, 22 and the bead roof 23 arranged between the bead flanks 21, 22 are shown. The bead flank 21, 22 and the bead roof 23 enclose a bead interior 24 on the rear side of the individual plate 10' facing towards the second individual plate 10". Openings 25, 26 are arranged in the bead flanks 21, 22 and are indicated here by arrows. The opening 25 in the bead flank 21 is used to conduct a media (for example a fuel, a reaction gas, a reaction product, or a coolant) through the bead flank 21. The opening 26 in the bead flank 22 is used to guide a medium through the bead flank 22.

On the left exterior of the bead arrangement 14*a*, a guide channel 127 not according to the invention is connected to the opening 25. The bead interior 24 is fluidically connected to the passage opening 10*a* or to the media channel formed by the passage opening 10*a* via the opening 25 and the guide channel 127. The guide channel 127 not according to the invention has a constant height along the x-direction 8. On the right exterior of the bead arrangement 14*a*, a guide channel 27 according to the invention is connected to the opening 26. The bead interior 24 is fluidically connected to an active region of the individual plate 10' on the front side of the individual plate 10' via the opening 26 and the guide channel 27 according to the invention, and the opening 33 in one of the two individual plates 10', 10" of the separator plate 10. For example, the bead interior 24 is fluidically connected to the previously described structure 17 on the front side of the individual plate 10' via the opening 26, the guide channel 27 according to the invention, and the opening 33 (see FIG. 2). In alternative embodiments (not shown), the guide channel 27 can also produce a fluidic connection between the bead interior 24 and the previously described cavity 18, which is arranged between the individual plates 10', 10" of the separator plate 10 and is designed for the passage of a coolant between the individual plates 10', 10". Here, the opening 33 is then spared. A medium can thus be guided through the bead arrangement 14*a* via the guide channel 127, the opening 25, the bead interior 24, the opening 26, and the guide channel 27.

The guide channel 27 according to the invention extends in each case from an inlet or outlet of the guide channel 27, which for example in the form of an opening forms an end of the guide channel 27 facing away from the bead arrangement 14*a*, as far as the bead flank 22 or as far as the opening 26 in the bead flank 22. Provided the guide channel 27 produces a fluidic connection between the bead interior 24 and the cavity 18 for passage of a coolant, the guide channel 27 does not have a passage opening in the individual plate 10' at its end facing away from the bead arrangement 14*a*, since the coolant in this case should not pass into the active region on the front side of the individual plate 10'. The end of the guide channel 27 facing away from the bead arrangement 14*a* can then be given for example by a step-like change in the height of the guide channel 27.

The guide channel 27 is formed in one part or one piece with the individual plate 10'. For example, the guide channel 27 is integrally formed, in particular stamped, in the individual plate 10'. Both the bead arrangement 14*a* and the guide channel 27 are usually formed in one piece with the individual plate 10' and stamped therein. The guide channel 127 is also formed in one piece with the individual plates 10' and is stamped therein.

The guide channel 27 according to the invention differs from the guide channel 127 not according to the invention in that a height of the guide channel 27 according to the invention increases in the direction of the bead arrangement 14*a* at least in sections. The height of the guide channel 27 is given by the distance of the channel roof 30 of the guide channel 27 from the flat surface plane 41 of the individual plate 10'. In the exemplary embodiments of FIGS. 9*a-d*, a first height 32' of the guide channel 27 in the region of a foot 42 of the bead flank 22, and a second height 32" of the guide channel 27 in the region of the end of the guide channel 27 facing away from the bead arrangement 14*a*, which is formed here by an opening 33 in one of the individual plates, are shown. The second height 32" is in each case smaller than the first height 32'. The first height 32 of the guide channel 27 is defined at a first distance from the bead arrangement 14*a*. The second height 32" of the guide channel 27 is defined at a second distance from the bead arrangement 14*a*. The first distance is in each case smaller than the second distance. The distance from the bead arrangement 14*a* is given for example in each case by the shortest distance from the foot 42 of the bead flank 22 or by the shortest distance from the bead roof 23.

Figure 9B:
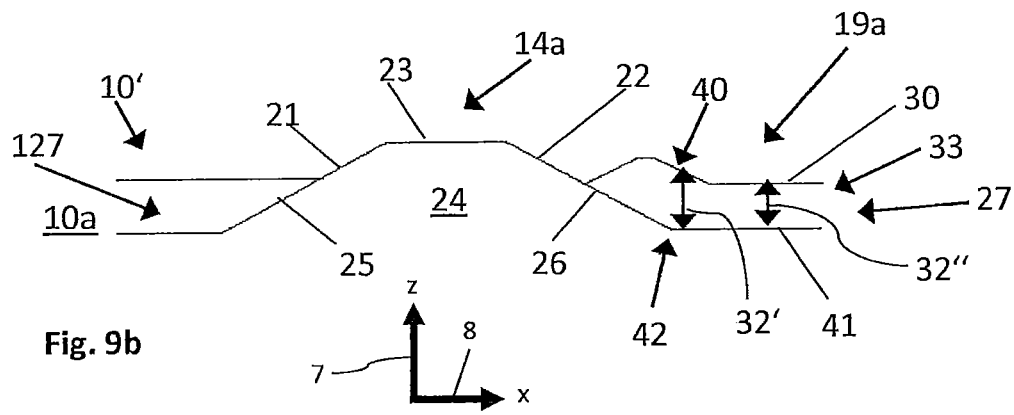
Figure 9C:
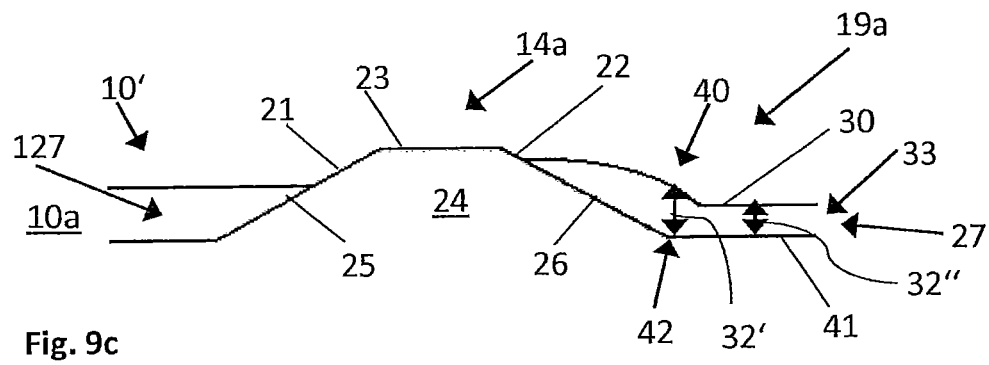
Figure 9D:
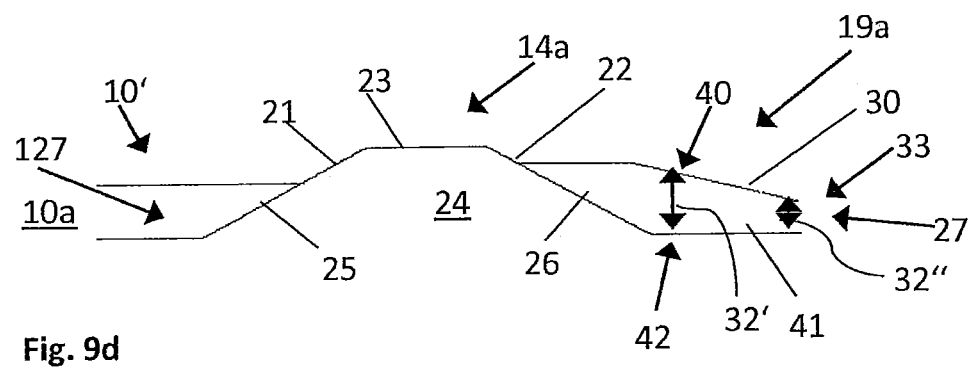

In the exemplary embodiments of FIGS. 9*a-d*, the height of the guide channel 27 increases from the end of the guide channel 27 facing away from the bead arrangement 14*a* to the bead foot 42, in each case monotonically. The height of the guide channel 27 increases strictly monotonically to the bead foot 42 in sections, in particular in a portion 40. In FIGS. 9*a*, 9*b* and 9*d*, the height of the guide channel 27 increases in the direction of the bead arrangement 14*a* in the portion 40 linearly. In FIG. 9*c* the channel roof 30 of the guide channel 27 in the portion 40 is convexly curved in the direction of the bead arrangement 14*a*. The height 32' of the guide channel 27 at the bead foot 42 is in each case at least 10% or at least 20% greater than the height 32" at the end 33 of the guide channel facing away from the bead arrangement 14*a*.

The opening 26 and the bead flank 22, at which the guide channel 27 transitions into the bead flank 22, reaches, perpendicularly to the flat surface plane 41 of the individual plate 10', that is to say in FIGS. 9*a-d* along the z-direction 7, in each case as far as a height that is at most 90%, preferably at most 85% of the height of the bead arrangement 14*a* in the uncompressed state. The height of the bead arrangement 14*a* is given here by the distance of the bead roof 23 from the flat surface plane 41 of the individual plates 10'. The inlet or outlet 33 of the guide channel 27 at the end of the guide channel facing away from the bead arrangement 14*a* reaches, perpendicularly to the flat surface plane 41 of the individual plate 10', in each case as far as a height that is at most 70% of the height of the bead arrangement 14*a*. In FIGS. 9*a-d* the height of the guide channel 27 at the end is even in each case less than 50% of the height of the bead arrangement 14*a*.

FIGS. 10*a-f* show sectional illustrations of different embodiments of the guide channels 27 according to the invention from FIGS. 6 to 8. The planes of section are oriented in each case perpendicularly to the flat surface plane of the individual plate 10' and perpendicularly to the media flow direction through the guide channel 27. The planes of section are thus oriented in each case in such a way that they minimise the cross-sectional area of the guide channel 27.

Figure 10A:
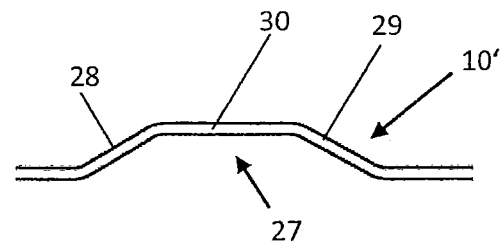
FIGS. 10a-f show sectional illustrations of guide channels according to the invention.
Figure 10B:
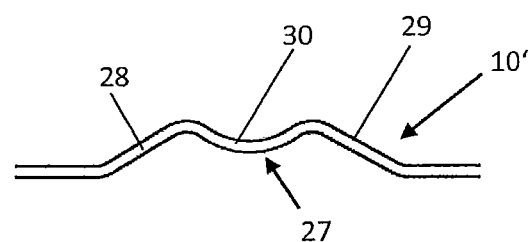
Figure 10C:
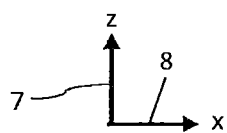
Figure 10C:
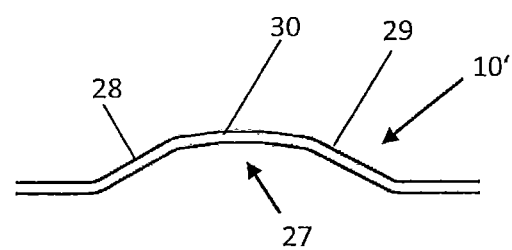
Figure 10D:
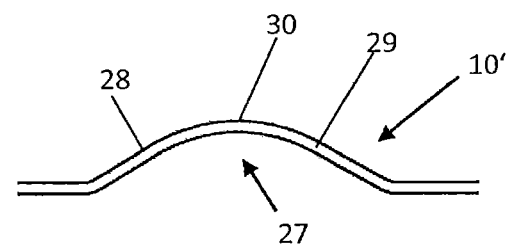
Figure 10E:
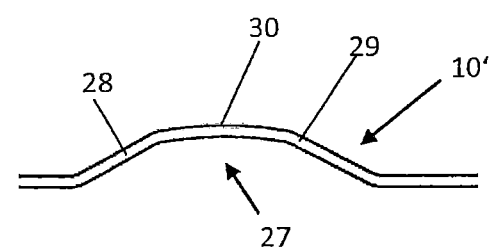
Figure 10F:
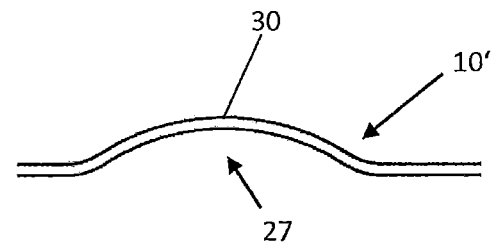

In FIG. 10*a* the cross-section of the guide channel 27 is trapezoidal, with straight side flanks 28, 29 and a straight channel roof 30. In FIG. 10*b* the side flanks 28, 29 are straight and the channel roof 30 is curved inwardly in a concave manner. In FIG. 10*c* the side flanks 28, 29 are straight and the channel roof 30 is divided into a number of short straight portions, so that the channel roof 30 is flattened relative to the side faces 28, 29. FIG. 10*d* shows straight side flanks 28, 29 and a rounded, convexly curved channel roof 30, wherein the curvature of the channel roof 30 transitions smoothly, i.e. without edges, into the straight side flank 28, 29. FIG. 10*d* shows straight side flanks 28, 29 and a convexly curved channel roof 30, wherein the transition of the curvature of the channel roof 30 into the side flanks 28, 29 has edges FIG. 10*f* shows a completely rounded cross-section. Both the channel roof 30 and the side flanks are convexly curved at least in regions and transition into one another without edges.

The bead arrangements can also, in principle, have cross-sections as shown in FIGS. 10*a-f*. The bead interior 24, the side flanks 28, 29, and the bead flanks 21, 22 then correspond to the guide channel 27, and the bead roof 23 corresponds to the channel roof 30. The heights and usually also the widths are generally greater in the case of the beads 14 than in the case of the guide channels 27.

Figure 11A:
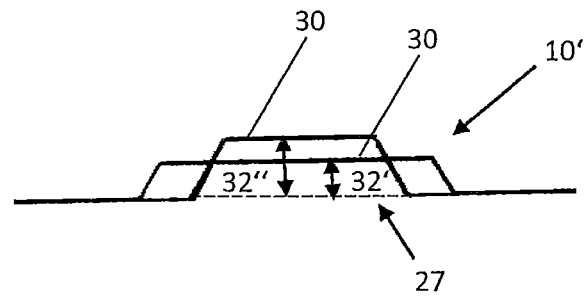
FIGS. 11a-e show sectional illustrations of guide channels according to the invention in each case at two different points of the same guide channel.
Figure 11B:
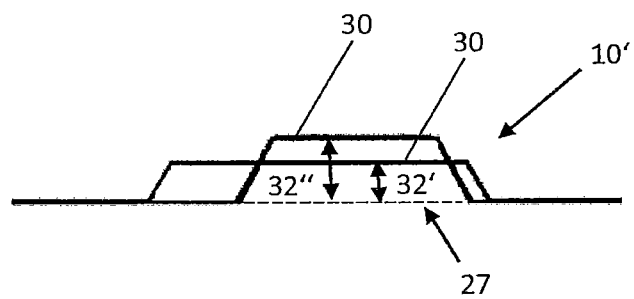
Figure 11C:
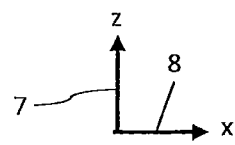
Figure 11C:
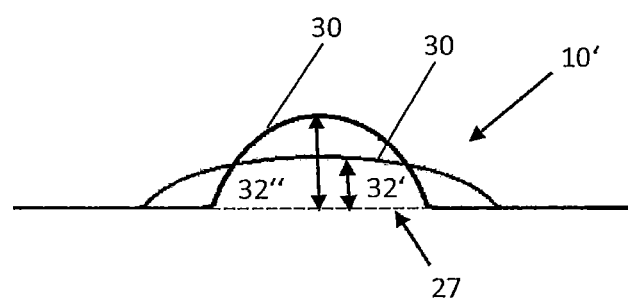
Figure 11D:
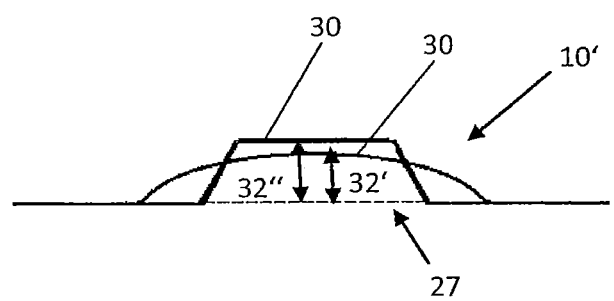
Figure 11E:
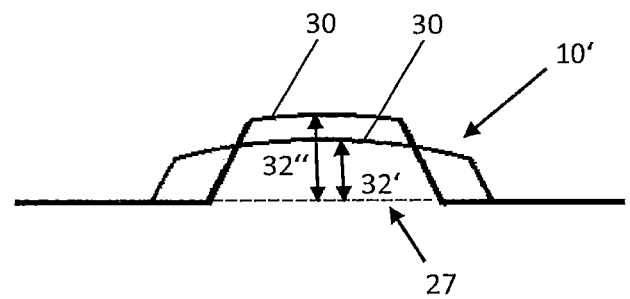

FIGS. 11*a-e* in turn show sectional illustrations of various embodiments of the guide channels 27 according to the invention from FIGS. 6-8. The planes of section are again oriented perpendicularly to the flat surface plane of the individual plate 10' and perpendicularly to the direction of media flow through the guide channel 27. Here, each of FIGS. 11*a-e* shows two sections of the same guide channel at different distances from the bead arrangement 14*a*. Here, it can be seen that the geometric shape of the cross-section of the same guide channel 27 can change along its extent. For example, the shape of the cross-section of the guide channel 27 in FIG. 11*d* transitions from a convexly curved shape into a trapezoid shape. FIG. 11*b* shows that the guide channels 27 can be formed asymmetrically.

The greatest height 32" and the smallest height 32' of the particular guide channel 27 are also shown. The associated widths 31", 31' of the channel 27 have not been shown, merely for the sake of clarity. The cross-section with the greater height in each case has a shorter distance from the bead arrangement 14*a* than the cross-section with the smaller height. It can thus be seen clearly in FIGS. 11*a-e* that the width of the guide channel 27, defined in each case at half height of the guide channel 27, decreases in the direction of the bead arrangement 14*a*, whereas the height 32 of the guide channel 27 increases in the direction of the bead arrangement 14*a*. However, the shape of the cross-section of the guide channel 27 changes here in each case in such a way that the cross-sectional area along the extent of the channel changes in each case at most by 20%, preferably in each case by less than 10%.

The invention claimed is:

1. A separator plate for an electrochemical system, comprising:
    at least one passage opening for forming a media channel for feeding or discharging media;
    at least one bead arrangement arranged around the at least one passage opening, for the purpose of sealing said passage opening, wherein at least one of the flanks of the bead arrangement comprises at least one opening for conducting a medium through the bead flank; and
    at least one guide channel, which is connected, on an exterior of the bead arrangement, to the opening in the bead flank and is fluidically connected to a bead interior via the opening in the bead flank;
    wherein the guide channel is designed such that a guide channel height perpendicularly to the flat surface plane of the separator plate increases in the direction of the bead arrangement at least in sections.

2. The separator plate according to claim 1, wherein the guide channel is designed such that a cross-sectional area of the guide channel along the middle 25% of the extent of the guide channel, changes by 25% at most, wherein the guide channel extends from an end of the guide channel facing away from the bead arrangement to the opening in the bead flank.

3. The separator plate according to claim 1, wherein the guide channel is designed such that a width of the guide channel defined parallel to the flat surface plane of the separator plate decreases in the direction of the bead arrangement at least in sections.

4. The separator plate according to claim 1, wherein the guide channel is designed such that the height of the guide channel increases monotonically along the guide channel.

5. The separator plate according to claim 1, wherein the guide channel is designed such that the height of the guide channel increases linearly.

6. The separator plate according to claim 1, wherein the guide channel is designed such that the width of the guide channel decreases monotonically along the guide channel at least over the 60% of the length of the guide channel arranged at a distance from the bead flank.

7. The separator plate according to claim 1, wherein the guide channel is designed such that the height of the guide channel increases along the guide channel at least by 20%.

8. The separator plate according to claim 1, wherein in an uncompressed state of the bead arrangement, the opening in the bead flank reaches, perpendicularly to the flat surface plane of the separator plate, as far as a height that is at most 90% of the height of the bead arrangement.

9. The separator plate according to claim 1, wherein in an uncompressed state of the bead arrangement, the guide channel is designed such that an inlet or outlet of the guide channel, which forms an end of the guide channel facing away from the bead arrangement, reaches, perpendicularly to the flat surface plane of the separator plate, as far as a height that is at most 80% of the height of the bead arrangement.

10. The separator plate according to claim 1, wherein the guide channel has a rectangular, trapezoid, or at least partially rounded cross-section, at least in some sections.

11. The separator plate according to claim 1, wherein the guide channel is designed such that a roof of the guide channel has a convex curvature in the direction of the bead arrangement, at least in sections.

12. The separator plate according to claim 1, wherein an inner edge of the separator plate delimiting the passage opening extends in a wave-like manner at least in sections.

13. The separator plate according to claim 12, wherein the portion of the inner edge extending in a wave-like manner is arranged between a portion of the bead arrangement extending in a wave-like manner and the passage opening, wherein the following is true for a first wavelength $\lambda_1$ of the portion of the inner edge extending in a wave-like manner and for a second wavelength $\lambda_2$ of the portion of the bead arrangement extending in a wave-like manner: $\lambda_2 = \lambda_1$ or $\lambda_2 = 2 \cdot \lambda_1$.

14. The separator plate according to claim 1, wherein the bead arrangement extends in a wave-like manner at least in some sections, wherein at least one portion of the bead arrangement extending in a wave-like manner extends over at least two wavelengths.

15. The separator plate according to claim 14, wherein the opening is arranged in the bead flank, connected by the guide channel on the exterior of the bead arrangement, in the region of an inflection point of the portion of the bead arrangement extending in a wave-like manner.

16. The separator plate according to claim 1, wherein the separator plate is formed as a bipolar plate with two individual plates connected to one another, wherein the bead arrangement and the guide channel are formed in at least one of the individual plates.

17. The separator plate according to claim 16, wherein at least one of the flanks of the bead arrangement has multiple openings, which are each connected on the exterior of the bead arrangement by a separate guide channel, the height of which increases in the direction of the bead arrangement at least in some sections, wherein an integrally bonded connection between the individual plates is formed, at least between some of the guide channels arranged directly adjacently to one another.

18. The separator plate according to claim 17, wherein the integrally bonded connection is a soldered connection, an adhesively bonded connection, or a welded connection.

19. The separator plate according to claim 16, wherein the individual plates are formed from metal, wherein a thickness of the individual plates defined perpendicularly to the flat surface plane of the individual plates is in each case between 50 μm and 150 μm.

20. The separator plate according to claim 16, wherein the individual plates enclose a hollow space for the passage of a coolant.

21. The separator plate according to claim 20, wherein the hollow space for passage of a coolant is in fluid communication with the bead interior.

22. The separator plate according to claim 21, wherein at least one of the individual plates has a structure on its surface facing away from the other individual plate for guiding reaction medium, wherein the structure for guiding reaction medium is in fluidic communication with the bead interior via at least one inlet or outlet of the guide channel in the form of an opening in the individual plate.

23. The separator plate according to claim 1, wherein the opening and the guide channel are arranged on a flank of the bead arrangement facing away from the passage opening of the separator plate and/or on a flank of the bead arrangement facing in the direction of the passage opening of the separator plate.

24. The separator plate according to claim 1, wherein the bead arrangement is formed at least in some sections in such a way that the bead flanks each form an angle of less than 70 degrees, with a vertical direction oriented perpendicularly to the flat surface plane of the separator plate, and in that the bead roof has a convex curvature, so that the bead roof has a lower rigidity than the bead flanks.

25. The separator plate according to claim 1, wherein a height of the bead arrangement in an uncompressed state is less than 800 μm.

* * * * *